US012596517B2

(12) United States Patent
Takizawa et al.

(10) Patent No.: US 12,596,517 B2
(45) Date of Patent: Apr. 7, 2026

(54) LINKED DISPLAY SYSTEM AND LINKED DISPLAY METHOD

(71) Applicant: Maxell, Ltd., Kyoto (JP)

(72) Inventors: Kazuyuki Takizawa, Kyoto (JP);
Yasunobu Hashimoto, Kyoto (JP);
Hitoshi Akiyama, Kyoto (JP)

(73) Assignee: Maxell, Ltd., Kyoto (JP)

( * ) Notice: Subject to any disclaimer, the term of this patent is extended or adjusted under 35 U.S.C. 154(b) by 0 days.

(21) Appl. No.: 19/100,084

(22) PCT Filed: Aug. 9, 2022

(86) PCT No.: PCT/JP2022/030420
§ 371 (c)(1),
(2) Date: Jan. 30, 2025

(87) PCT Pub. No.: WO2024/034011
PCT Pub. Date: Feb. 15, 2024

(65) Prior Publication Data
US 2026/0037205 A1     Feb. 5, 2026

(51) Int. Cl.
*G06F 3/14*          (2006.01)
*G06F 3/01*          (2006.01)
(Continued)

(52) U.S. Cl.
CPC ............ *G06F 3/1454* (2013.01); *G06F 3/013* (2013.01); *G06F 3/0482* (2013.01); *G06V 20/20* (2022.01); *G06V 40/172* (2022.01)

(58) Field of Classification Search
CPC ...... G06F 3/1454; G06F 3/013; G06F 3/0482; G06V 20/20; G06V 40/172
See application file for complete search history.

(56) References Cited

U.S. PATENT DOCUMENTS

2012/0127124 A1\*  5/2012  Zanone ................. G06F 3/0446
                                                                    345/174
2012/0218171 A1    8/2012  Fujigaki
                            (Continued)

FOREIGN PATENT DOCUMENTS

JP          2007-334237 A      12/2007
JP          2012-178097 A       9/2012
                    (Continued)

OTHER PUBLICATIONS

Office Action dated Jul. 22, 2025, issued in corresponding Japanese patent application No. 2024-540117, 5 pages.
(Continued)

*Primary Examiner* — Premal R Patel
(74) *Attorney, Agent, or Firm* — Rimon P.C.

(57) ABSTRACT

A linked display method to be executed by a first information device and a second information device which are connected so as to communicate with each other, the method comprising: starting a linked operation between the first information device and the second information device; disabling a power saving mode of the first information device to switch a screen display of a first display provided in the first information device to be constantly turned on; transmitting second divided data including a part of data for display being shown on the first display to the second information device; showing, on the first display, first divided data that remains after the second divided data is cut out from the data for display; by the second information device, receiving the second divided data; and by the second information device, showing the second divided data on a second display provided in the second information device.

15 Claims, 27 Drawing Sheets

(51) Int. Cl.
   *G06F 3/0482*      (2013.01)
   *G06V 20/20*       (2022.01)
   *G06V 40/16*       (2022.01)

(56)                References Cited

U.S. PATENT DOCUMENTS

| | | | |
|---|---|---|---|
| 2015/0281569 | A1 | 10/2015 | Mizuno et al. |
| 2017/0337897 | A1 | 11/2017 | Jung et al. |
| 2018/0199200 | A1* | 7/2018 | Wang .................... H04L 63/083 |
| 2019/0056813 | A1 | 2/2019 | Fukuda et al. |
| 2021/0042132 | A1* | 2/2021 | Park ........................ H04L 67/10 |
| 2021/0149618 | A1* | 5/2021 | Lee ........................... G06F 3/16 |
| 2021/0333554 | A1 | 10/2021 | Ohno et al. |
| 2022/0252880 | A1 | 8/2022 | Kurachi et al. |
| 2023/0146677 | A1* | 5/2023 | Woo ........................ G06F 3/017 |
| | | | 345/156 |

FOREIGN PATENT DOCUMENTS

| | | |
|---|---|---|
| JP | 2015-201160 A | 11/2015 |
| JP | 2019-036914 A | 3/2019 |
| JP | 2021-176004 A | 11/2021 |
| WO | 2021/064823 A1 | 4/2021 |

OTHER PUBLICATIONS

International Search Report received in PCT Application No. PCT/ JP2022/030420, dated Sep. 13, 2022.

\* cited by examiner

BEFORE LINKAGE

AFTER LINKAGE

CHANGE OF VIEWING SCENE

3

FIG. 8(b-1)
FIG. 8(b-2)
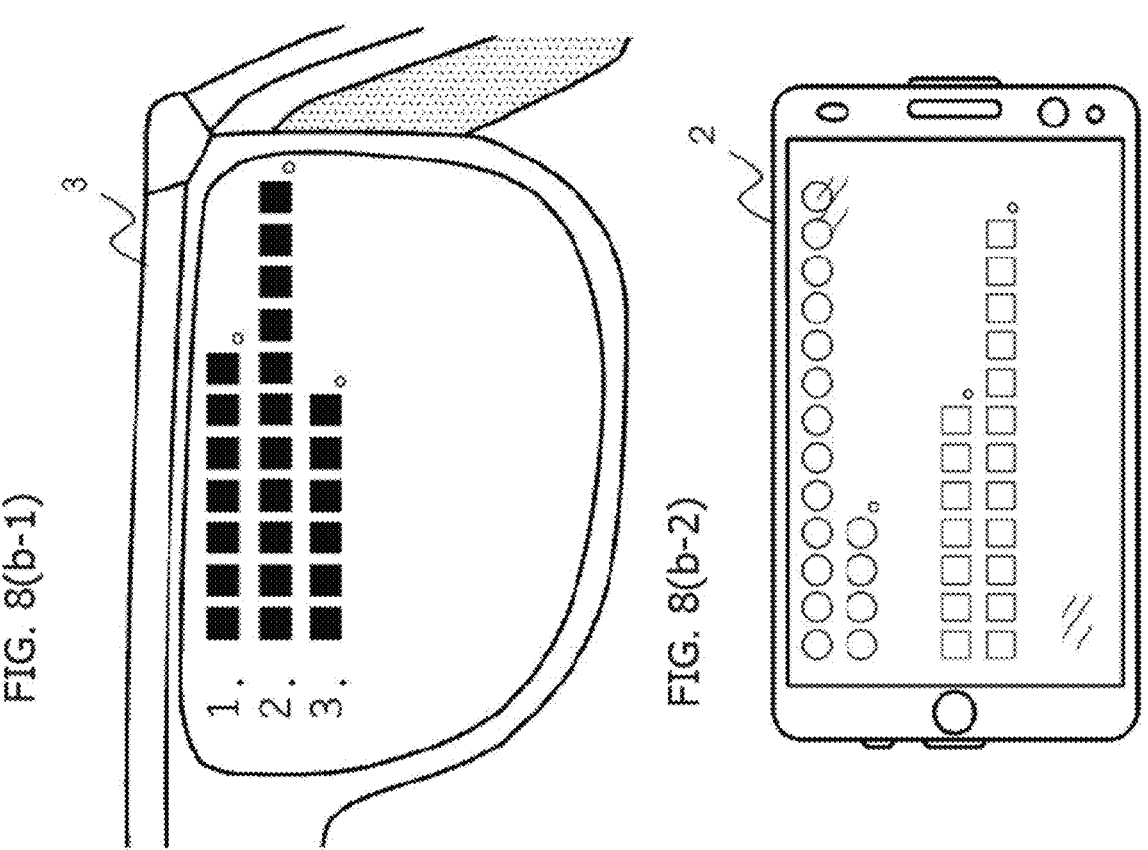
FIG. 8(a)
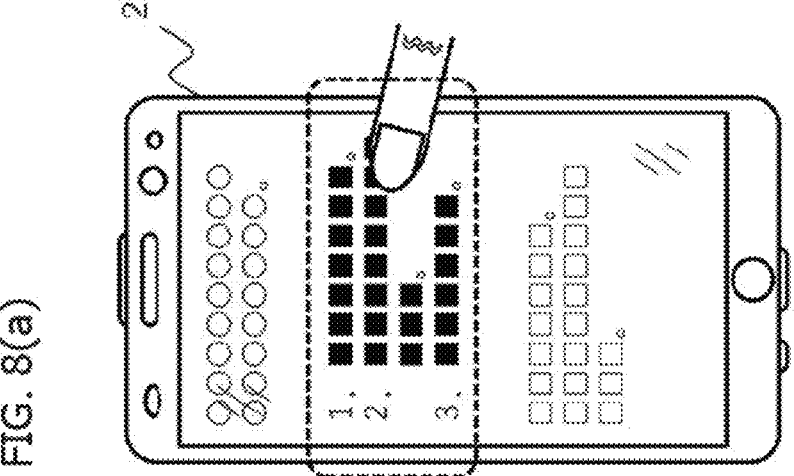

FIG. 9

| OPERATION MODE | CPU SPEED | APPLI CATION | DATA (SYNCH RONIZE) | SCREEN DISPLAY | VOICE SEARCH (RECOGNIZE) | WIRELESS (TELEPHONE) | WIRELESS (Wi-Fi) | WIRELESS (BT) | TRIGGER DETECTION | TOTAL POWER CONSUMP TION | USABILITY |
|---|---|---|---|---|---|---|---|---|---|---|---|
| NORMAL MODE | HIGH | O | O | O | O | O | O | O | × | HIGH | HIGH |
| LINKAGE POWER SAVINGMODE (CONSTANTLY TURNING ON SCREEN) | LOW | × | × | O | O | O | × | O | × | INTER MEDIATE | HIGH |
| LINKAGE POWER SAVINGMODE (RETURNING BY TRIGGER) | LOW | × | × | × | × | O | × | × | O | LOW | LOW |
| POWERSAVING MODE | LOW | × | × | × | × | O | × | × | × | LOWEST | LOW |

FIG. 17
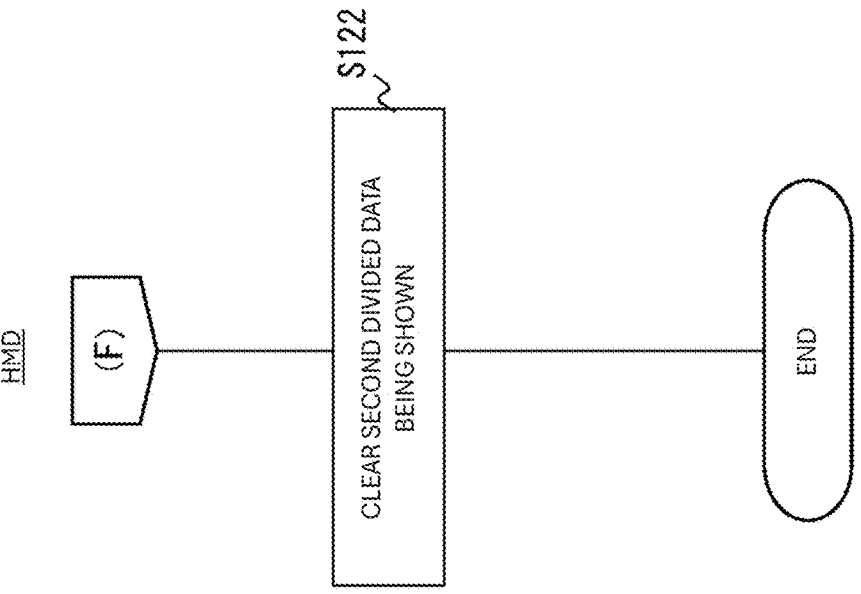
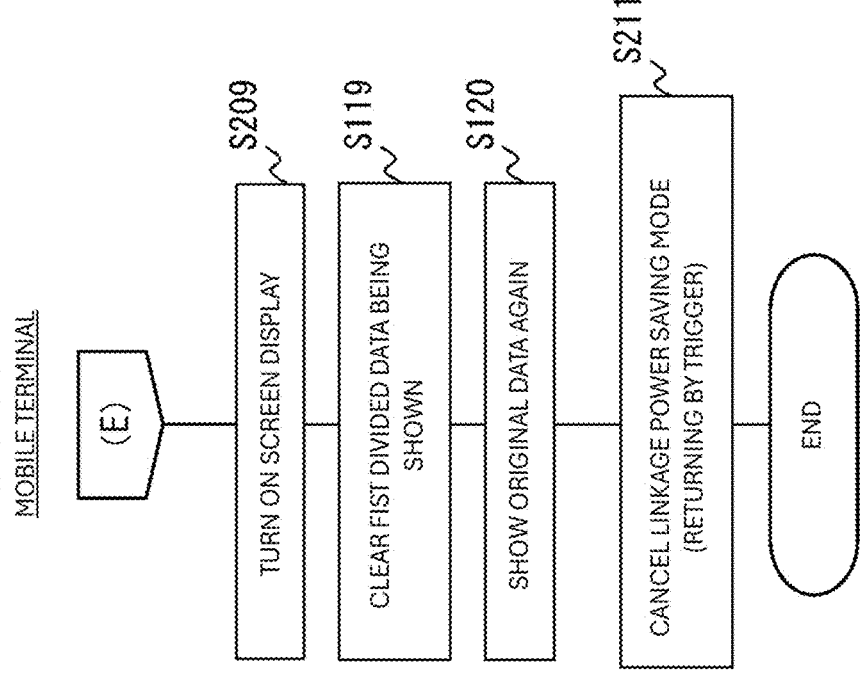

OPERATION OF MOBILE TERMINAL 2

NORMAL OPERATION

LINKED OPERATION

NORMAL OPERATION

POWER CONSUMPTION

IN NORMAL MODE

IN LINKAGE POWER SAVING MODE (CONSTANTLY TURNING ON SCREEN)

IN POWER SAVING MODE

START LINKED OPERATION (t1)

IN LINKAGE POWER SAVING MODE, CONSTANTLY TURN ON SCREEN

TERMINATE LINKED OPERATION (t3)

TIME

GAZE POINT=OTHER THAN MOBILE TERMINAL
⇒STOP VIDEO

GAZE POINT=TEXT
⇒STOP VIDEO/SLOW DOWN/REPEAT
(USER SETTING AVAILABLE)

GAZE POINT=MOVE LEFT AND RIGHT
⇒LEFT: REWIND
RIGHT: FAST-FORWARD

GAZE POINT=MOBILE TERMINAL
⇒PLAY VIDEO

1.

2.

3.

LINKED DISPLAY SYSTEM AND LINKED DISPLAY METHOD

CROSS-REFERENCE TO RELATED APPLICATIONS

This application is the U.S. National Phase under 35 U.S.C. § 371 of International Application No. PCT/JP2022/030420, filed on Aug. 9, 2022, the entire contents of each of which are hereby incorporated by reference.

TECHNICAL FIELD

The present invention relates to a linked display system and a linked display method, in particular, relates to a linked display technique using a head mounted display (HMD) and a mobile terminal.

BACKGROUND ART

As a technique of displaying content with text and images being mixed on separate devices, Patent Literature 1 discloses a display system "comprising an image display device that displays a video included in content, a text display device that displays text and still images included in the content, and a control device that controls display of the image display device and that of the text display device, wherein the control device manages data in the content by dividing it into a video portion, a text portion, and a still image portion, causes the image display device to display the video based on the data about the video portion, and causes the text display device to display the text and still images based on the data about the text portion and that about the still image portion" (excerpted from Abstract).

CITATION LIST

Patent Literature

Patent Literature 1: JP-A-2007-334237

SUMMARY OF INVENTION

Technical Problem

Even if using the display system described above which is configured to divide the data that was originally the one data into a plurality of pieces and display them on separate devices, for a user, it may be not sufficient to watch just one of them. For example, the user may wish to watch one data while watching the other data as necessary, such as a material list and a work procedure, an image (still image, video) and textual explanation, an image and an enlarged image, and the like.

However, in a typical mobile terminal, a power saving mode is activated if any operation is not made for the mobile terminal for a certain period of time so as to suppress battery consumption, which blanks the display and thus the screen gets dark.

If applying a mobile terminal to the display system according to Patent Literature 1, the display screen of the mobile terminal would be turned off even while a user is watching the screen of the display device being linked to the mobile terminal. Each time this happens, the user has to touch a screen or enter a password, which results in decrease in the usability.

The present invention has been made in view of the circumstances described above, and an object of the present invention is to improve usability of a linked display system and a linked display method of dividing and displaying data on a plurality of information devices which are linked with each other.

Solution to Problem

In order to solve the problems described above, the present invention includes the features described in the scope of claims. One of the aspects of the present invention is a linked display system comprising: a first information device; and a second information device, the first information device and the second information device being connected so as to communicate with each other, the first information device including a first display, a first communication device configured to transmit and receive data to and from the second information device, and a first processor configured to control the first display and the first communication device, the second information device including a second display, a second communication device configured to transmit and receive data to and from the first information device, and a second processor configured to control the second display and the second communication device, the first information device having a normal mode and a power saving mode, the normal mode being for turning on a screen display of the first display and maintaining device-to-device communication with the second information device, and the power saving mode being for turning off the screen display of the first display when no operation is performed on the first information device for a predetermined period of time or longer, the first information device being configured to: upon start of a linked operation between the first information device and the second information device, disable the power saving mode of the first information device and switch the screen display of the first display to be constantly turned on; transmit second divided data including a part of data for display to be shown on the first display to the second information device; and show, on the first display, first divided data that remains after the second divided data is cut out from the data for display, and the second information device being configured to, upon receiving the second divided data, show the second divided data on the second display.

Advantageous Effects of Invention

According to the present invention, it is possible to improve usability of a linked display system and a linked display method of dividing and displaying data on a plurality of information devices which are linked with each other. The objects, configurations, and advantageous effects other than those described above will be clarified by explanation of the embodiments below.

BRIEF DESCRIPTION OF DRAWINGS

FIGS. 1(a) and 1(b) schematically illustrate a linked display system for an information device and a head mounted display according to the present embodiment, in which FIG. 1(a) and FIG. 1(b) illustrate before and after they are linked from each other, respectively.

FIGS. 8(*a*), 8(*b*-1) and 8(*b*-2) illustrate an example of a data display screen 1 by a linked display system, in which FIG. 8(*a*) illustrates a screen of a mobile terminal before linkage, FIG. 8(*b*-1) illustrates a screen of an HMD after linkage, and FIG. 8(*b*-2) illustrates a screen of a mobile terminal after linkage.

FIG. 9 is a diagram for explaining operation modes of a mobile terminal.

FIG. 17 is a control flow diagram (second half) of a linked display system according to the second embodiment.

DESCRIPTION OF EMBODIMENTS

The present invention can be expected to, for example, diversify and improve technology in labor-intensive industries, and thus contribute to Goal 8.2 (Achieve higher levels of economic productivity through diversification, technological upgrading and innovation, including through a focus on high-value added and labor-intensive sectors) of the Sustainable Development Goals (SDGs) proposed by the United Nations.

Hereinafter, exemplified embodiments of the present invention will be described with reference to the drawings. Throughout all the drawings, the same components are provided with the same reference signs, and repetitive explanation therefor will be omitted.

Figures 1A, 1B:
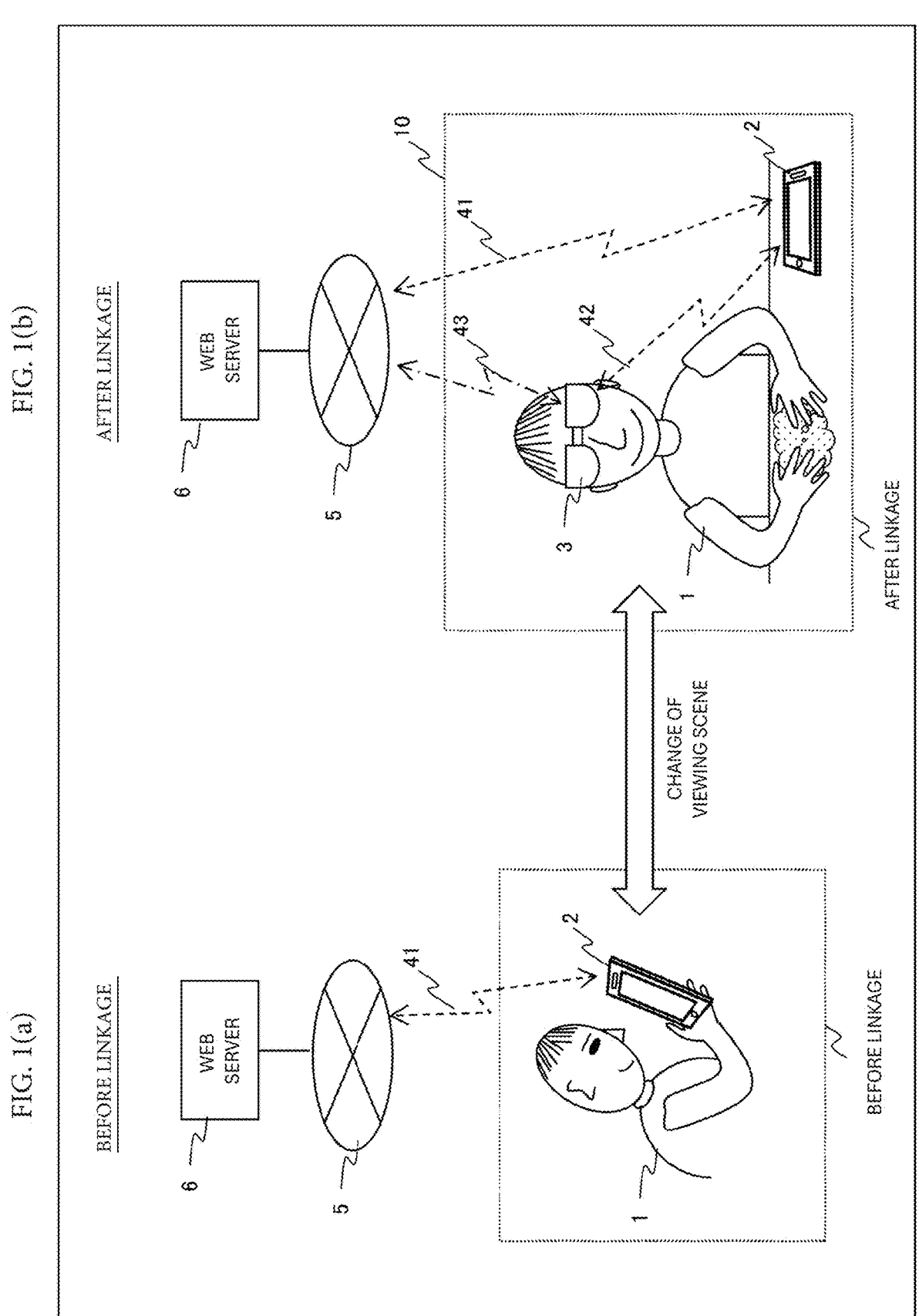

FIG. 1 schematically illustrates a linked display system for a mobile terminal 2 and a head mounted display (HMD) 3 according to the present embodiment, in which FIG. 1(*a*) and FIG. 1(*b*) illustrate before and after they are linked with each other, respectively.

In the state before the linkage is established as illustrated in FIG. 1(*a*), a user 1 is operating only the mobile terminal 2 (corresponding to the first information device). The mobile terminal 2 is connected to a WEB server 6 through a network 5 so as to communicate therewith. The mobile terminal 2 receives data from the WEB server 6 through a first data acquisition route 41 and displays the received data on the mobile terminal 2.

In the state after linkage is established as illustrated in FIG. 1(*b*), the user 1 is wearing the HMD 3 (corresponding to the second information device) and operating the mobile terminal 2. The mobile terminal 2 is connected to the WEB server 6 through the network 5 so as to communicate therewith. The mobile terminal 2 receives data for display (content) from the WEB server 6 via the first data acquisition route 41. The mobile terminal 2 is connected to (linked with) the HMD 3 so as to communicate therewith, and divides the data for display which has been obtained from the WEB server 6. For each part of the data as divided, the divided data to be displayed on the HMD 3 will be referred to as second divided data, and the data obtained after the second divided data is cut out from the data for display will be referred to as first divided data. The mobile terminal 2 transfers the second divided data to the HMD 3 through a second data transfer route 42 for linkage.

In a further example of acquisition of data, it may be configured that the HMD 3 is connected to the WEB server 6 so as to communicate therewith, the WEB server 6 divides data to create third data, the mobile terminal 2 receives data from the WEB server 6 via the first data acquisition route 41, and the HMD 3 receives the third data from the WEB server 6 via a third data acquisition path 43. In this as well, the HMD 3 and the mobile terminal 2 may be connected so as to communicate with each other via the second data transfer route 42.

(Information Device)

Figure 2:
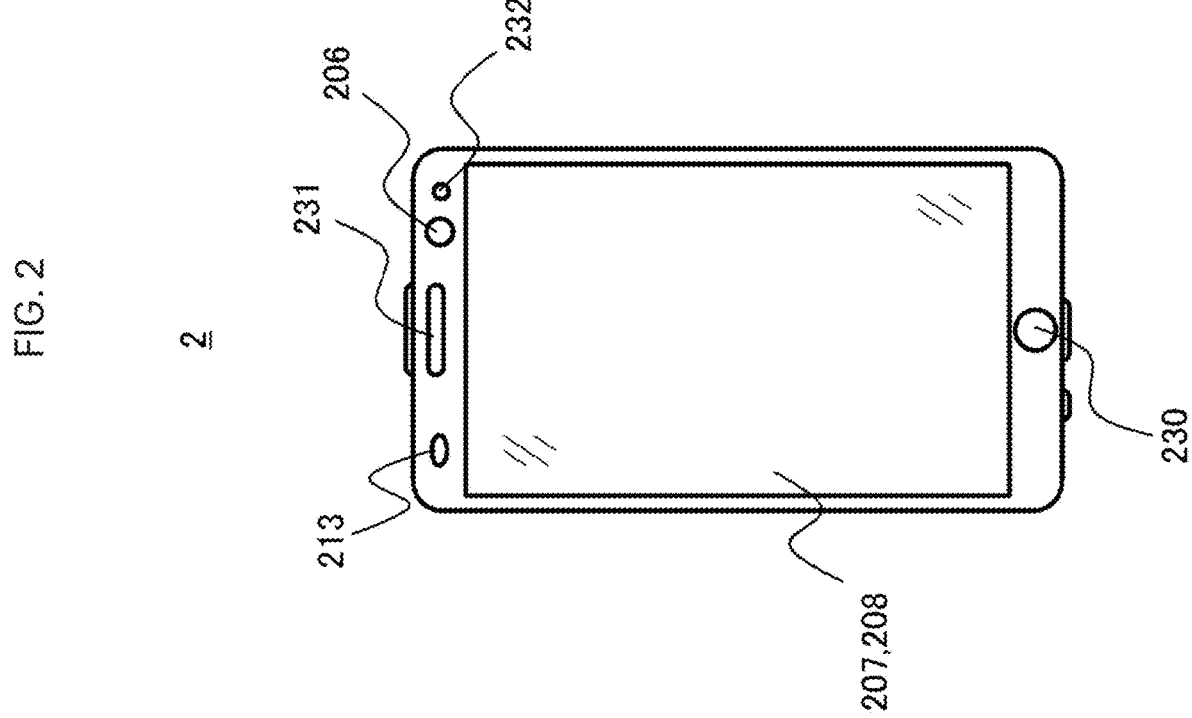
FIG. 2 is a front view of the appearance of a mobile terminal according to the present embodiment.
Figure 3:
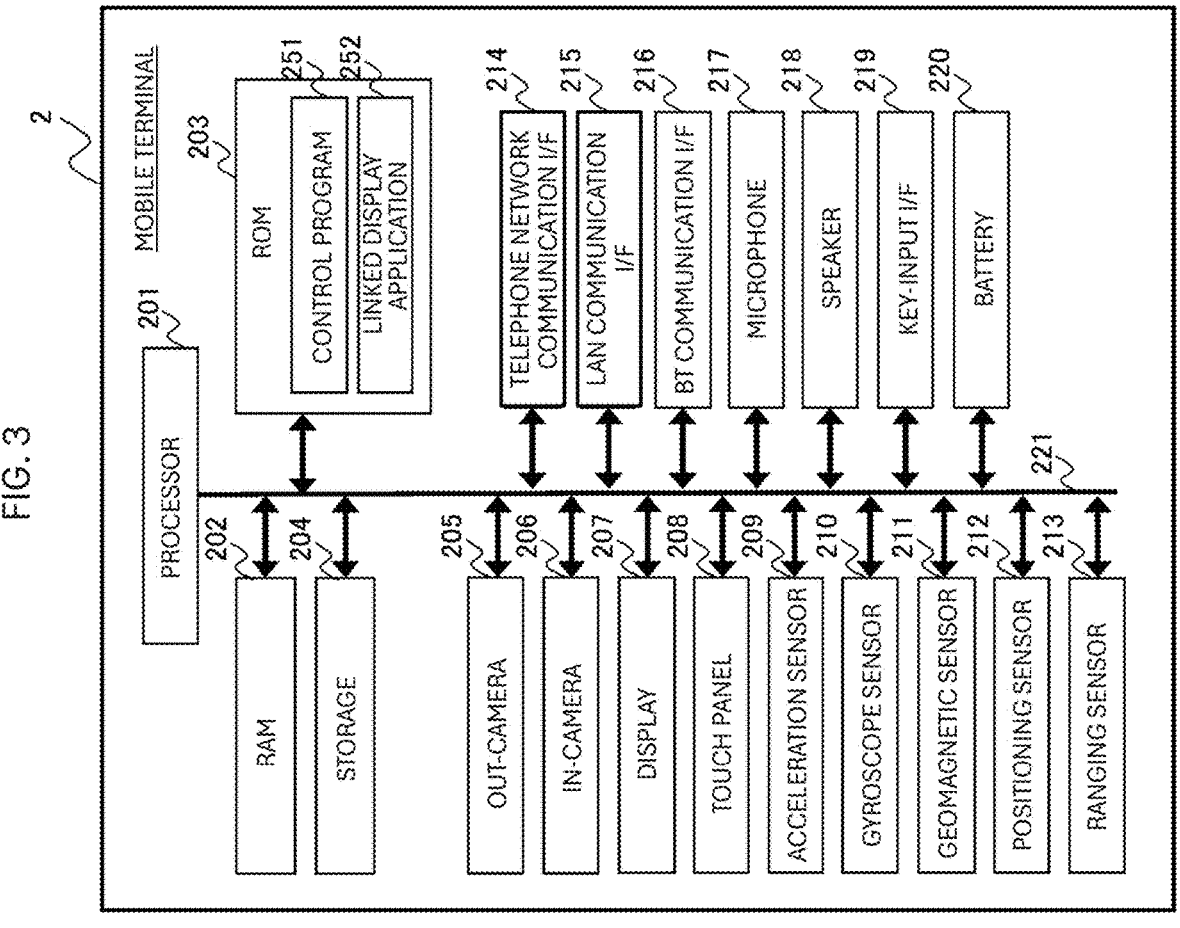
FIG. 3 is a schematic configuration diagram of a mobile terminal according to the present embodiment.

Referring to FIG. 2 and FIG. 3, an example of a mobile terminal will be described. FIG. 2 is a front view of the appearance of the mobile terminal 2 according to the present embodiment, and FIG. 3 is a schematic configuration diagram of the mobile terminal 2 according to the present embodiment.

As illustrated in FIG. 2, the mobile terminal 2 includes, on its front surface, a home button 230, a receiver 231, a notification lamp 232, an in-camera 206, a ranging sensor 213, and a display 207 (corresponding to the "first display") on which a touch panel 208 are laminated. In addition, although not illustrated in FIG. 2, in the mobile terminal 2, for example, a volume button and a power button may be provided on its side surface, a speaker 218 (see FIG. 3), a microphone 217 (see FIG. 3), a connector for power supply and communication, and an earphone jack may be provided on its bottom surface, and an out-camera 205 (see FIG. 3) and a fingerprint sensor may be provided on its back surface. These components do not necessarily have to be arranged in the same manner as FIG. 2.

As illustrated in FIG. 3, the mobile terminal 2 includes a processor 201, a RAM 202, a ROM 203, a storage 204, the out-camera 205, the in-camera 206, the display 207, the touch panel 208, an acceleration sensor 209, a gyroscope sensor 210, a geomagnetic sensor 211, a positioning sensor 212, the ranging sensor 213, a telephone network communication I/F 214, a LAN communication I/F 215, a BT communication I/F 216 (BT: Bluetooth (registered trademark)), the microphone 217, the speaker 218, a key-input I/F 219, and a battery 220, which are connected to each other via a bus 221.

The ROM 203 includes a control program 251 for controlling the basic operation of the mobile terminal 2 and a linked display application 252 (installed in the mobile terminal 2), and the processor 201 loads these programs in the RAM 202 and executes them. The linked display application 252 may be stored in the storage 204.

The storage 204 is capable of retaining the data generated in the process and result of execution of the processing programs.

The telephone network communication I/F 214 is a kind of communication devices for implementing a communication function of mobile communication such as 4G and 5G.

The ranging sensor 213 measures a distance from the mobile terminal 2 by, for example, using a stereo camera with respect to feature points of an outline of a real object, or by two-dimensionally irradiating a light beam using a TOF (Time of Flight) technique.

The LAN communication I/F 215 is a kind of communication devices for implementing a communication function of wireless communication using Wi-Fi (registered trademark) standard or the like. For implementing this function, wireless communication means other than the LAN communication I/F 215 may be used.

The BT communication I/F 216 is a kind of communication devices used for linkage between the mobile terminal 2 and the HMD 3. Wireless communication means for the linkage between the mobile terminal 2 and the HMD 3 is not limited to BT but may be realized by other means.
(HMD)

Figure 4:
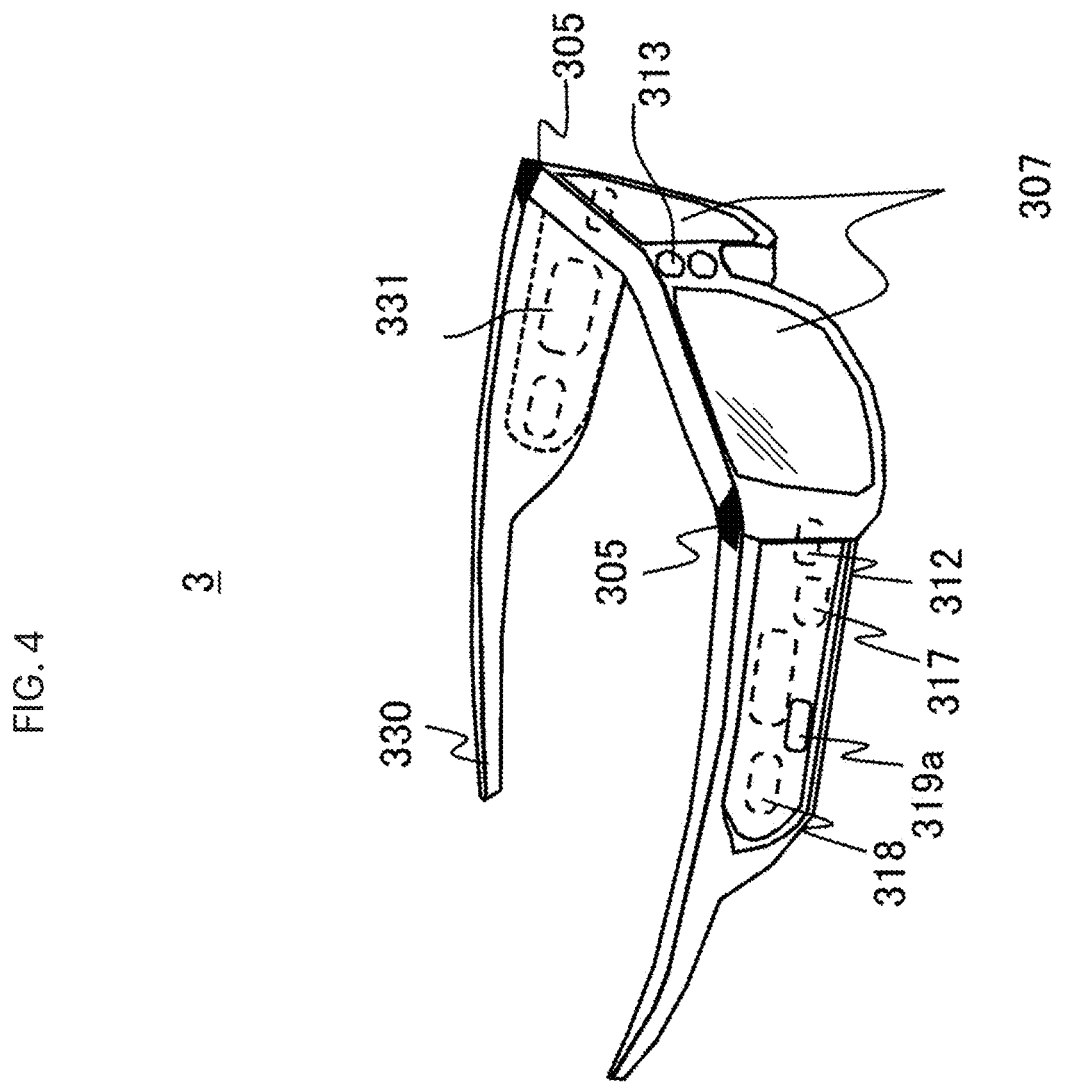
FIG. 4 illustrates the appearance of an HMD according to the present embodiment.
Figure 5:
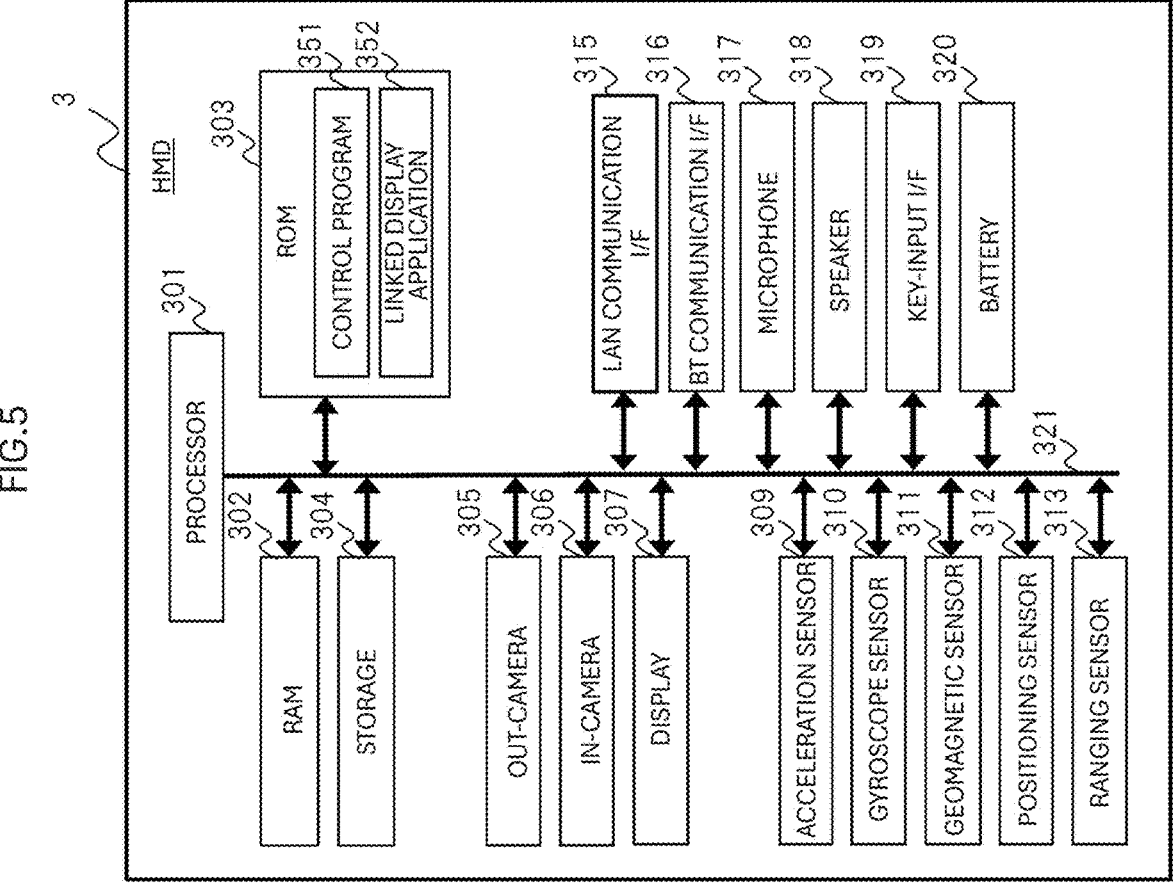
FIG. 5 is a schematic configuration diagram of an HMD according to the present embodiment.

Referring to FIG. 4 and FIG. 5, an example of the HMD 3 will be described. FIG. 4 illustrates the appearance of the HMD 3 according to the present embodiment, and FIG. 5 is a schematic configuration diagram of the HMD 3 according to the present embodiment.

As illustrated in FIG. 4, in the HMD 3, a frame 330 is provided with a controller 331, an out-camera 305, a ranging sensor 313, a display 307, a positioning sensor 312, a microphone 317, a speaker 318, and an operating-key 319a, and the frame 330 is worn to the head of the user 1. In the state where the user 1 is wearing the HMD 3, the display 307 and the ranging sensor 313 are positioned in front of the eyes of the user 1.

The out-camera 305 is mounted so as to capture an image of front of the line of sight of the user 1, and the ranging sensor 313 measures the distance to a real object in a real space captured in the image (corresponding to a "forward image") by the out-camera 305.

The controller 331 includes the components such as a processor 301, a RAM 302, a ROM 303, and a storage 304 (see FIG. 5). However, the controller 331 does not necessarily have to be arranged as illustrated in FIG. 4.

As illustrated in FIG. 5, the HMD 3 includes the processor 301, the RAM 302, the ROM 303, the storage 304, the out-camera 305, an in-camera 306, the display 307, an acceleration sensor 309, a gyroscope sensor 310, a geomagnetic sensor 311, the positioning sensor 312, the ranging sensor 313, a LAN communication I/F 315, a BT communication I/F 316, the microphone 317, the speaker 318, a key-input I/F 319, and a battery 320, which are connected to each other via a bus 321.

Figure 6:
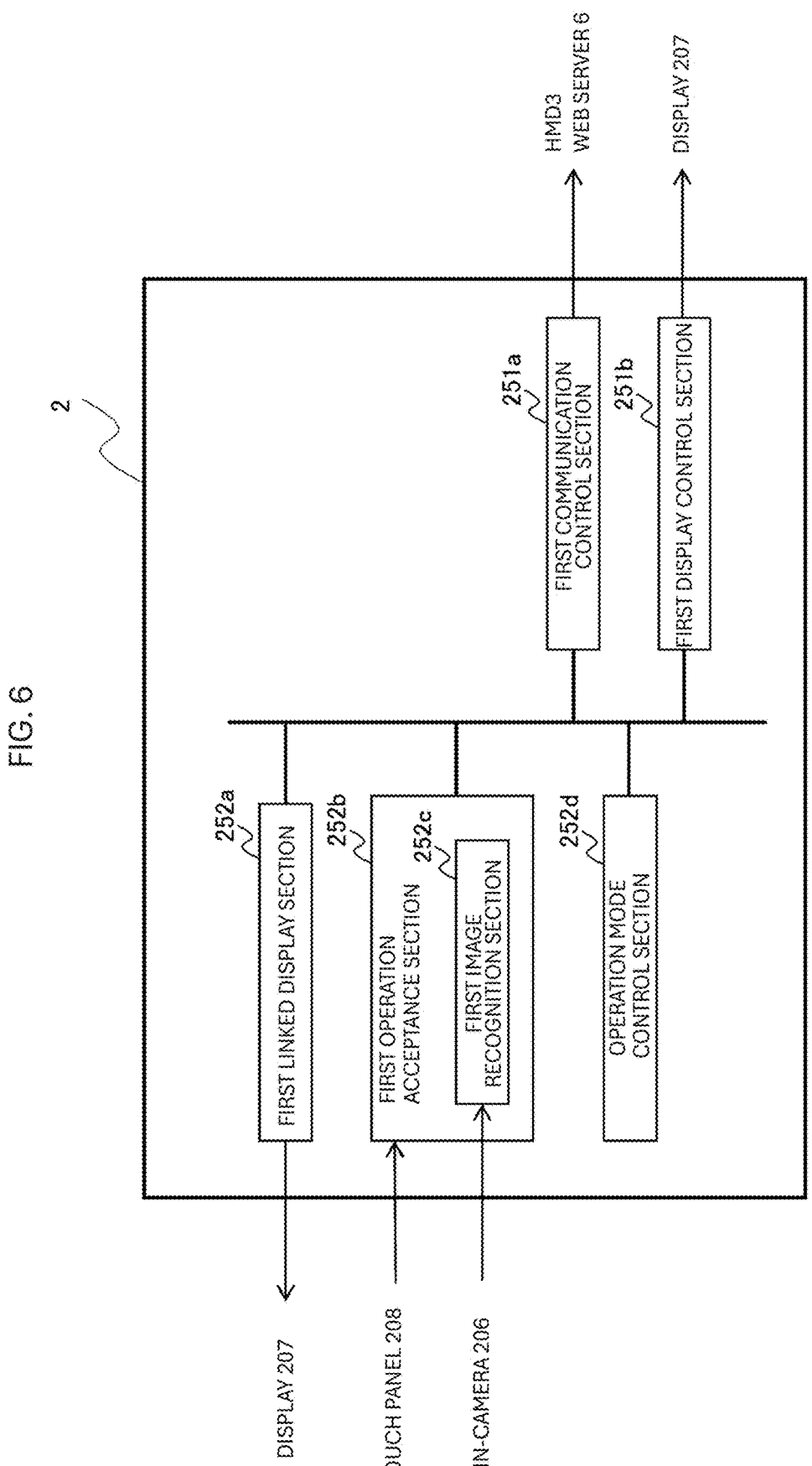
FIG. 6 is a functional block diagram of a control program and a linked display application installed in a mobile terminal.

FIG. 6 is a functional block diagram of the control program 251 and the linked display application 252 installed in the mobile terminal 2.

The control program 251 includes a first communication control section 251a and a first display control section 251b.

The first communication control section 251a communicates with the HMD 3 and the WEB server 6.

The first display control section 251b controls display on the display 207 during a normal mode.

The linked display application 252 includes a first linked display section 252a, a first operation acceptance section 252b, and an operation mode control section 252d.

The first linked display section 252a controls display on the display 207 during a linked operation. The first linked display section 252a also resizes an image.

The first operation acceptance section 252b accepts an operation made by means of a touch operation on the touch panel 208. The first operation acceptance section 252b includes a first image recognition section 252c. The first image recognition section 252c carries out an image recognition process on an image captured by the in-camera 206 to determine whether the user 1 is looking at the mobile terminal 2 from the front.

The operation mode control section 252d switches the operation mode of the normal mode for turning all the functions on, a power saving mode, a linkage power saving mode (constantly turning on screen), or a linkage power saving mode (returning by trigger). The details of each mode will be described later.

The processor 201 loads the control program 251 and the linked display application 252 on the RAM 202 and executes them so as to configure each of the sections described above.

Figure 7:
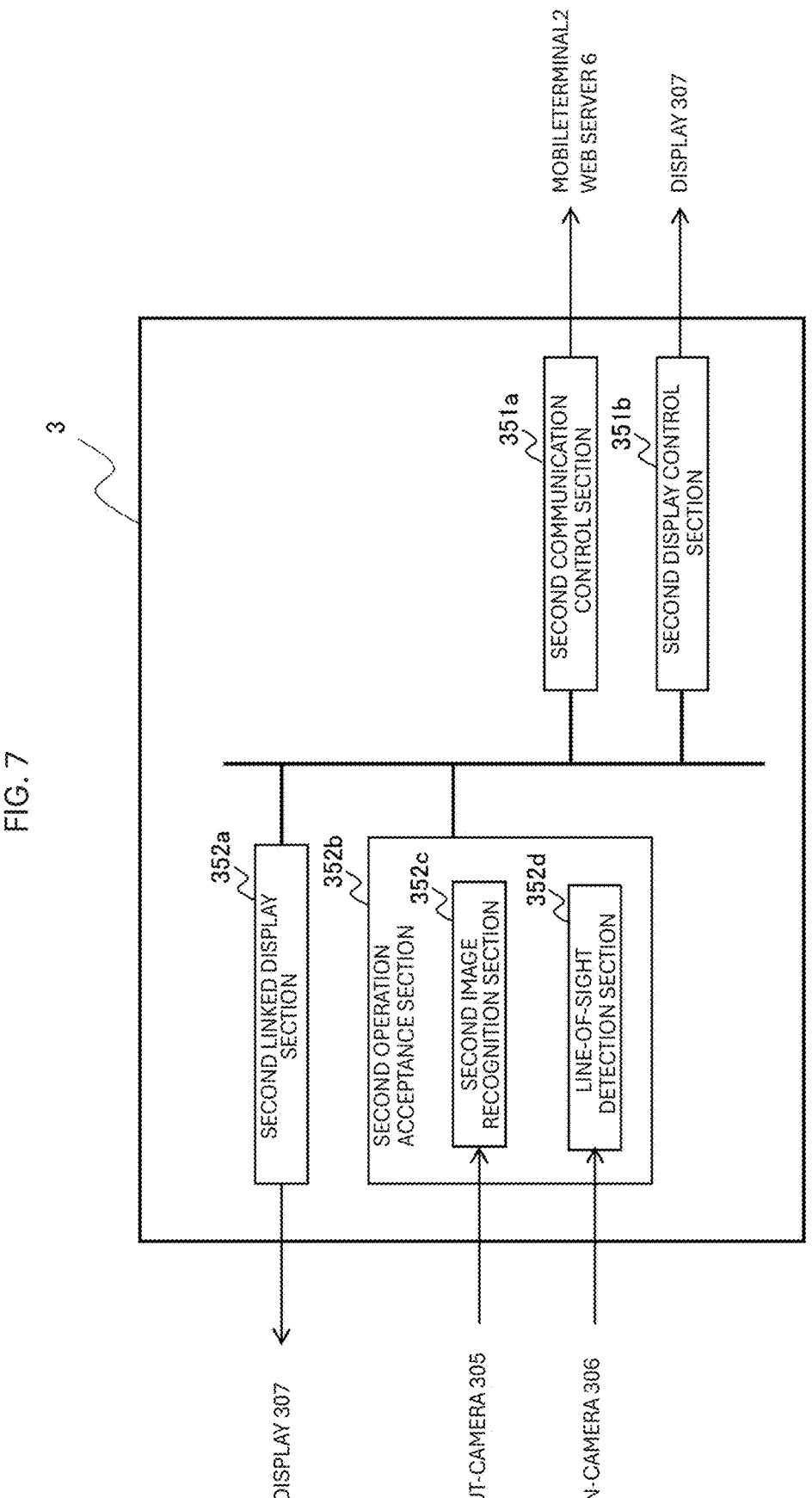
FIG. 7 is a functional block diagram of a control program and a linked display application installed in an HMD.

FIG. 7 is a functional block diagram of the control program 351 and the linked display application 352 installed in the HMD 3.

The control program 351 includes a second communication control section 351a and a second display control section 351b.

The second communication control section 351a communicates with the mobile terminal 2 and the WEB server 6.

The second display control section 351b controls display on the display 307 while the HMD 3 is not linked with the mobile terminal 2.

The linked display application 352 includes a second linked display section 352a and a second operation acceptance section 352b.

The second linked display section 352*a* controls display on the display 307 during the linked operation. The second linked display section 352*a* also resizes an image.

The second operation acceptance section 352*b* includes a second image recognition section 352*c* and a line-of-sight detection section (line-of-sight detection sensor) 352*d*. The second image recognition section 352*c* carries out an image recognition process on an image captured by the out-camera 305 to recognize the mobile terminal 2.

The line-of-sight detection section 352*d* detects an area of the image captured by the in-camera 306 in which the eyes of the user 1 are captured, and carries out line-of-sight tracking. The second operation acceptance section 352*b* superimposes a result of the line-of-sight tracking and the captured image of the mobile terminal 2 which has been recognized by the second image recognition section 352*c* with each other, so as to determine whether the user 1 is looking at the mobile terminal 2. Alternatively, the second operation acceptance section 352*b* may be configured to determine where the gaze point (line-of-sight) of the user 1 is positioned within the angle of view of the out-camera 305 based on a result of the line-of-sight tracking, and associate the position of the gaze point or an action including the movement of the gaze point with an operation for the linked display, so as to accept an operation. The line-of-sight sensor is configured to include the in-camera 306 and the line-of-sight detection section 352*d*.

The processor 301 loads the control program 351 and the linked display application 352 on the RAM 302 and executes them so as to configure each of the sections described above.

FIG. 8 illustrates an example of a data display screen 1 by the linked display system, in which FIG. 8(*a*) illustrates a screen of the mobile terminal 2 before linkage, FIG. 8(*b*-1) illustrates a screen of the HMD 3 after linkage, and FIG. 8(*b*-2) illustrates a screen of the mobile terminal 2 after linkage. FIG. 8 illustrates a display example of data including only text.

The data is divided in advance at the time of its creation, and the user 1 may designate the data to be transmitted to the HMD 3 by touching the text on the touch panel 208. Alternatively, the user 1 may designate an area thereof on the touch panel 208.

After the linkage between the mobile terminal 2 and the HMD 3 is established, the data is preferably enlarged (optimized) to fit the size of each screen.

It may be preferably configured that, a line-of-sight operation performed for the HMD 3 causes the data being shown on the HMD 3 to be changed, for example, blinking the eyes twice preferably causes the data being shown on the HMD 3 and that being shown on the mobile terminal 2 to be swapped.

FIG. 8 illustrates an example of a screen display of the data including text only, however, the data may partially include an image. In such a case, the image may be transmitted to the HMD 3, or the image may be shown on the mobile terminal 2 while the text is being shown on the HMD 3, regardless of the type of the data or the type of the divided data.

FIG. 9 is a diagram for explaining operation modes of the mobile terminal.

In the present embodiment, the mobile terminal 2 operates in the normal mode, the power saving mode, the linkage power saving mode (constantly turning on screen), and a linkage power saving mode (returning by trigger), and the last two modes are executed only during linkage (linked operation).

The normal mode is a mode for turning all the functions on. The mobile terminal 2 operates in the normal mode in the condition where it is being used but not in a linked display state. In the mobile terminal 2, the normal mode is switched to the power saving mode in absence of any operation performed for a predetermined period of time.

The power saving mode is a mode, for example, for only turning on the wireless communication function (telephone network communication I/F 214) but turning off the other functions, and the mobile terminal 2 is shifted to the power saving mode in absence of any operation performed on the mobile terminal 2 for a predetermined period of time. The power saving mode is an operation mode with the lowest power consumption. Accordingly, in the power saving mode, the screen display of the display 207 is also turned off. For turning on the screen display that has been turned off in the power saving mode, the user 1 has to operate the mobile terminal 2 by touching the touch panel 208, operating the home button 230, and the like. In the case where a passcode has been set, the user 1 is requested to input the passcode.

During linkage, the mobile terminal 2 may operate in the normal mode with disabling the power saving mode, or may operate in the power saving mode or the linkage power saving mode.

The linkage power saving mode includes the linkage power saving mode (constantly turning on screen) and the linkage power saving mode (returning by trigger). In the linkage power saving mode (constantly turning on screen), only the minimum functions necessary for linked display with the HMD 3 are turned on while the other functions are turned off so that the mobile terminal 2 can operate with less power consumption than in the normal mode. Specifically, the functions of the telephone network communication I/F 214, the device-to-device connection with the HMD 3 by BT connection, and the screen display are turned on while the other functions are turned off. In addition, the functions of audio recognition for voice control may also be turned on. In the linkage power saving mode (returning by trigger), in the same manner as the power saving mode, screen display is turned off while the mobile terminal 2 is not being operated. In this case, for turning on the screen display, it is necessary to detect a trigger. In the linkage power saving mode (returning by trigger), turning on the function of detecting a trigger, and for example, detecting an operation which serves as a trigger and is performed by the mobile terminal 2 or the HMD 3 enables switching of the screen display from turning off to turning on.

Figure 10:
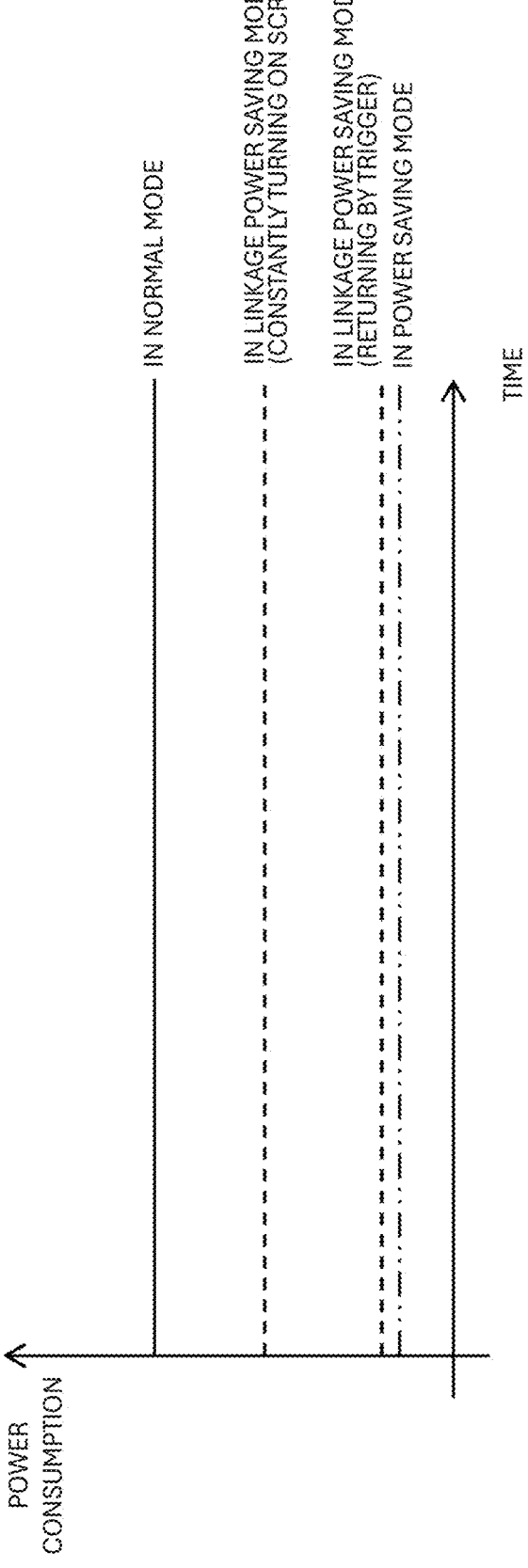
FIG. 10 illustrates comparison of power consumption in each operation mode.

FIG. 10 illustrates the comparison of power consumption in each operation mode.

The power consumption in the linkage power saving mode (constantly turning on screen) is lower than that in the normal mode, and much lower in the linkage power saving mode (returning by trigger). In the power saving mode, the power consumption is lower than that in the linkage power saving mode (returning by trigger).

In the following, a control flow of the linked display system according to each embodiment will be described, however, the necessary operation modes differ depending on each embodiment.

First Embodiment

The first embodiment is an embodiment for disabling the power saving mode while the mobile terminal and the HMD are linked to each other, and making the mobile terminal operate in the normal mode with the screen thereof being constantly turned on.

Figure 11:
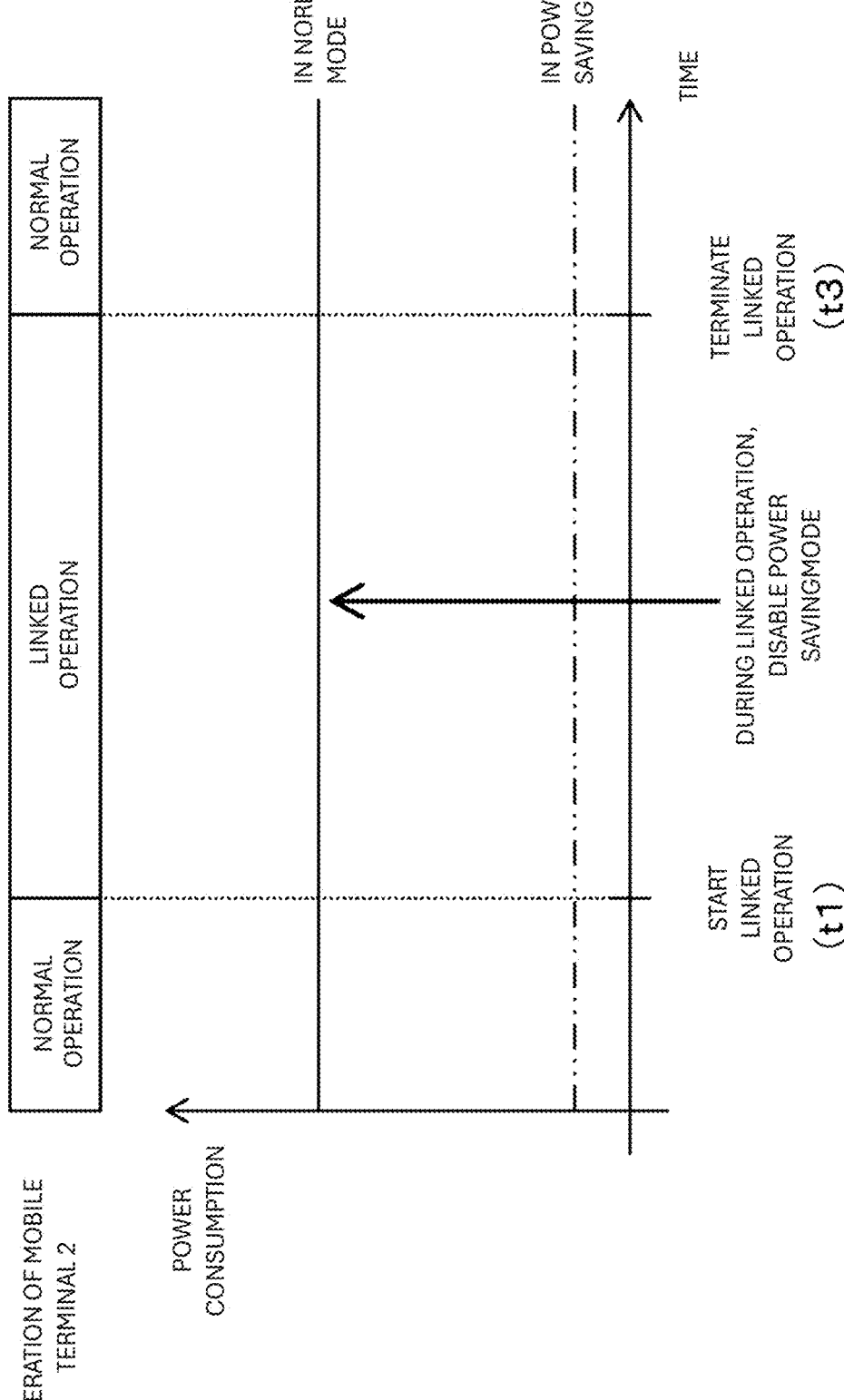
FIG. 11 illustrates relation between an operation of a mobile terminal and power consumption according to the first embodiment.

FIG. 11 illustrates the relation between an operation of the mobile terminal and power consumption according to the first embodiment.

As illustrated in FIG. 11, in the first embodiment, the power saving mode is switched from an enabled state to a disabled state when a linked operation between the mobile terminal 2 and the HMD 3 starts at a time t1 while the mobile terminal 2 is operating in the normal operation, in other words, when the mobile terminal 2 receives an acknowledgement in response to an HMD linked operation start signal after device-to-device connection is established. Thus, the power saving mode is disabled during the linked operation, and accordingly, the screen of the mobile terminal 2 is kept turned on even if no operation is performed for a certain period of time or longer.

Upon termination of the linked operation at a time t3, the power saving mode is switched from the disabled state to the enabled state, and the mobile terminal 2 performs a normal operation. Thus, the power consumption increases during the linked operation as the power saving mode is disabled, which, however, allows the screen to be viewed at any time and thus does not decrease the operation efficiency.

Figure 12:
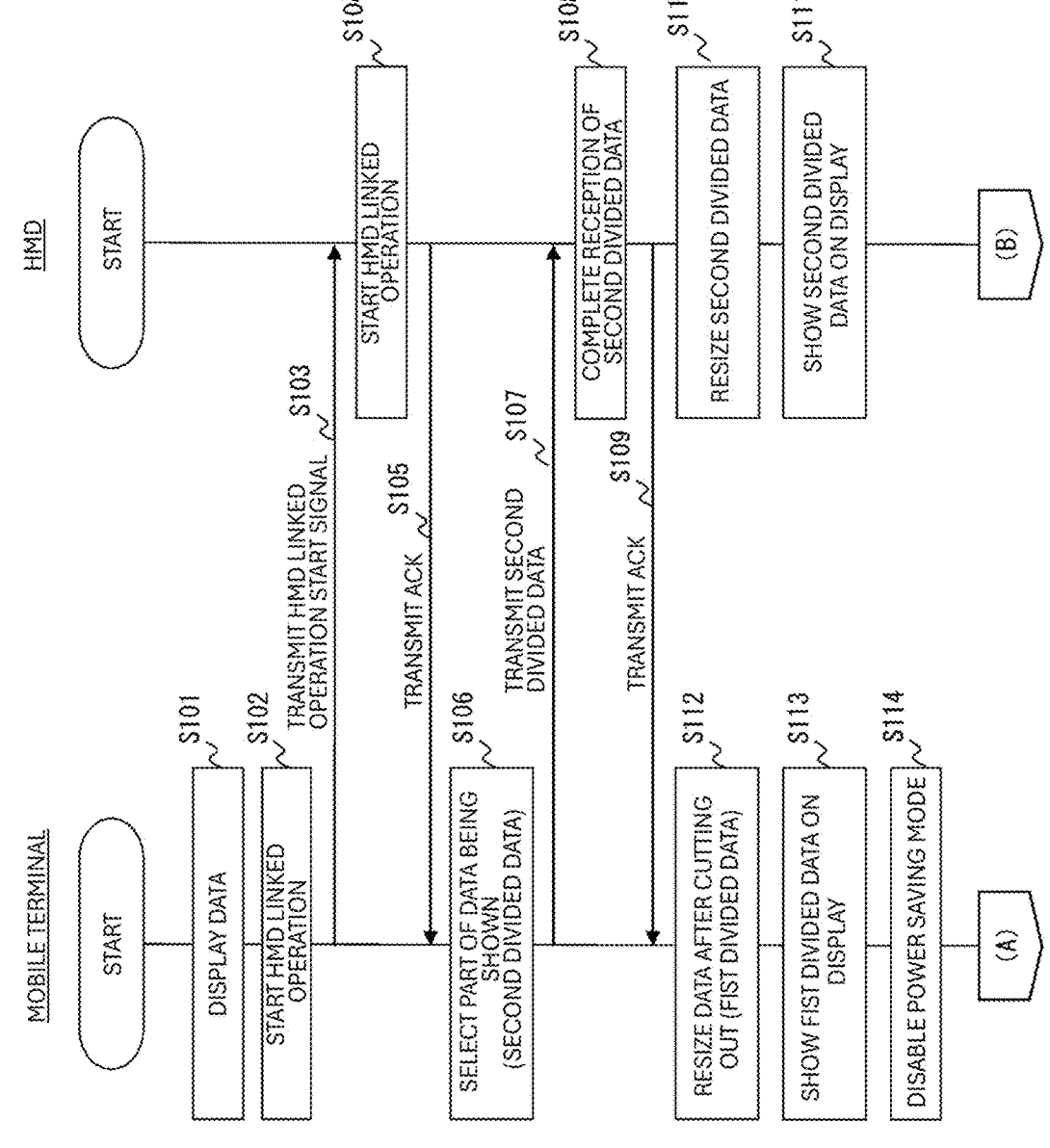
FIG. 12 is a control flow diagram (first half) of a linked display system according to the first embodiment.
Figure 13:
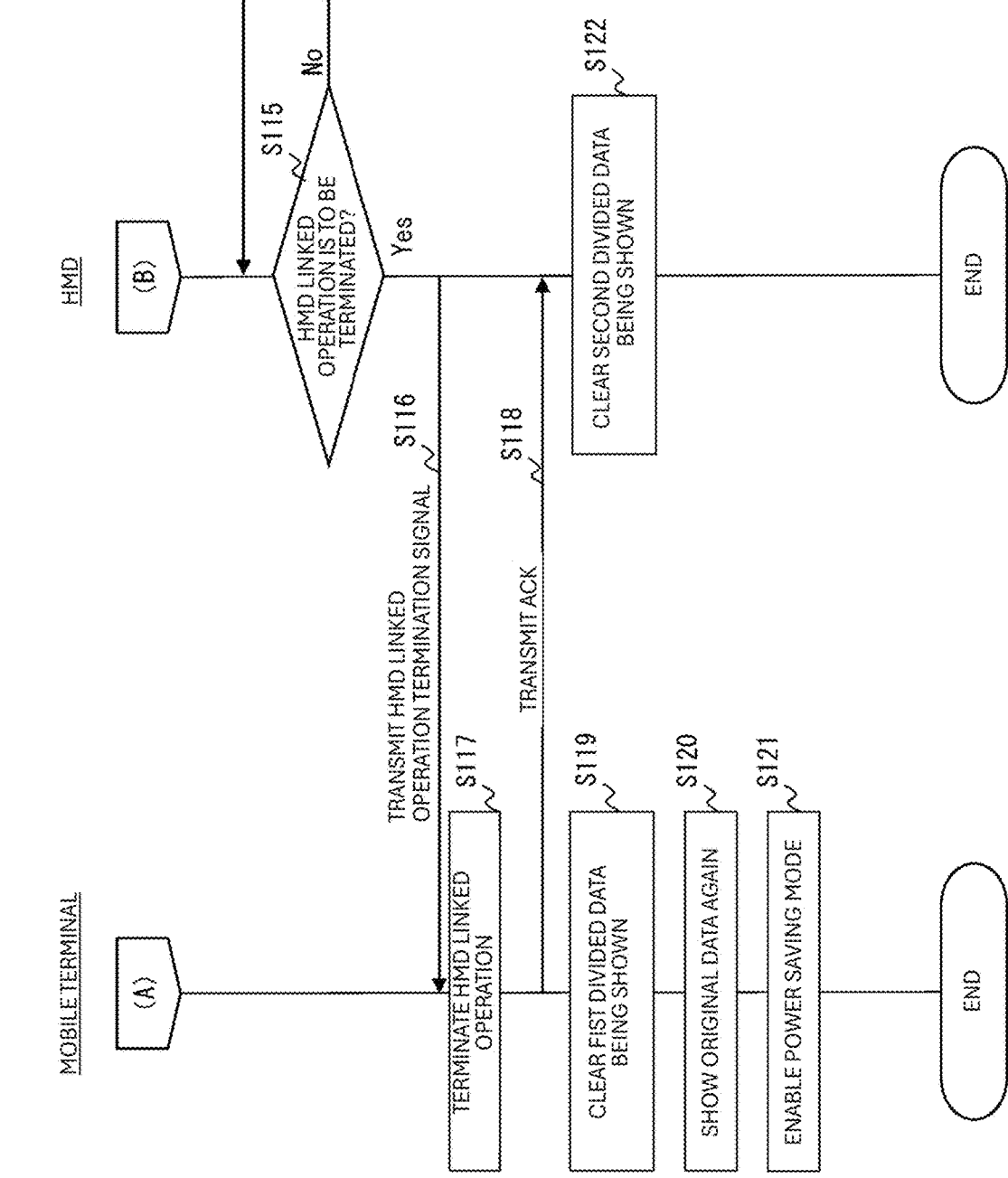
FIG. 13 is a control flow diagram (second half) of a linked display system according to the first embodiment.

FIG. 12 is a control flow diagram (first half) of the linked display system according to the first embodiment. FIG. 13 is a control flow diagram (second half) of the linked display system according to the first embodiment.

As illustrated in FIG. 12, the mobile terminal 2 receives data from the WEB server 6 and shows it on the display 207 (S101).

Upon starting the linked display application 252 (S102), the mobile terminal 2 transmits an HMD linked operation start signal to the HMD 3 (S103).

After pairing between the HMD 3 and the mobile terminal 2 is established, upon receiving the linked operation start signal, the HMD 3 starts the HMD linked operation (S104) and transmits an acknowledgement (ACK packet) to the mobile terminal 2 (S105).

The first operation acceptance section 252b accepts a data division operation via the touch panel 208. The first linked display section 252a divides the data in accordance with the data division operation, selects the data included in the divided area as the second divided data (S106), and transmits it to the HMD 3 (S107).

Upon completing the reception of the second divided data (S108), the second communication control section 351a of the HMD 3 transmits an acknowledgement to the mobile terminal 2 (S109).

The second linked display section 352a of the HMD 3 resizes the second divided data to fit the size of the display 307 (S110), and shows it on the display 307 (S111).

On the other hand, in the mobile terminal 2, upon receiving the acknowledgement transmitted in step S109, the first linked display section 252a resizes the first divided data to fit the size of the display 207 (S112) and shows it on the display 207 (S113).

The operation mode control section 252d of the mobile terminal 2 disables the power saving mode (S114). This causes the screen of the display 207 to be constantly turned on regardless of whether the mobile terminal 2 has been operated until the linked display of the HMD 3 is cancelled.

As illustrated in FIG. 13, the second linked display section 352a of the HMD 3 continues the linked display until the HMD linked operation is terminated (S115: No).

On the other hand, upon receiving an instruction to terminate the HMD linked operation by means of a gesture input or a line-of-sight input (S115: Yes), the HMD 3 transmits a linked operation termination signal to the mobile terminal 2 (S116).

Upon receiving the linked operation termination signal, the mobile terminal 2 terminates the linked operation (S117). The first linked display section 252a returns an acknowledgement (S118) and clears the first divided data being shown (S119), and the first display control section 251b shows the original data on the display 207 again (S120). The operation mode control section 252d enables the power saving mode (S121).

Upon receiving the acknowledgement transmitted in step S118, the HMD 3 clears the second divided data being shown on the display 307 (S122).

According to the first embodiment, upon start of the linked display of the mobile terminal 2 and the HMD 3, the power saving mode of the mobile terminal 2 is disabled, and the mobile terminal 2 constantly operates in the normal mode. This causes the screen of the mobile terminal 2 to be constantly turned on during linkage regardless of whether the mobile terminal 2 has been operated, and therefore, enables the user 1 to see the first divided data being shown on the screen at any time during linkage without operating the mobile terminal 2.

Furthermore, showing the second divided data on the HMD 3 enables the user 1 to see it without hardly moving his or her line-of-sight while performing the work at hand, and therefore, improvement in the work efficiency can be expected.

Second Embodiment

The second embodiment is an embodiment for keeping the power saving mode enabled while the mobile terminal 2 and the HMD 3 are linked to each other, and upon detection of a trigger by the HMD 3, making the mobile terminal 2 operate in the normal mode with the screen thereof being turned on. In typical cases, the mode of the mobile terminal 2 is switched to the power saving mode in absence of any operation performed thereto for a predetermined time period during execution of the normal mode. However, in the second embodiment and also the third embodiment which will be described later, start of the linked operation causes shift of the mode from the normal mode to the linkage power saving mode (returning by trigger).

Figure 14:
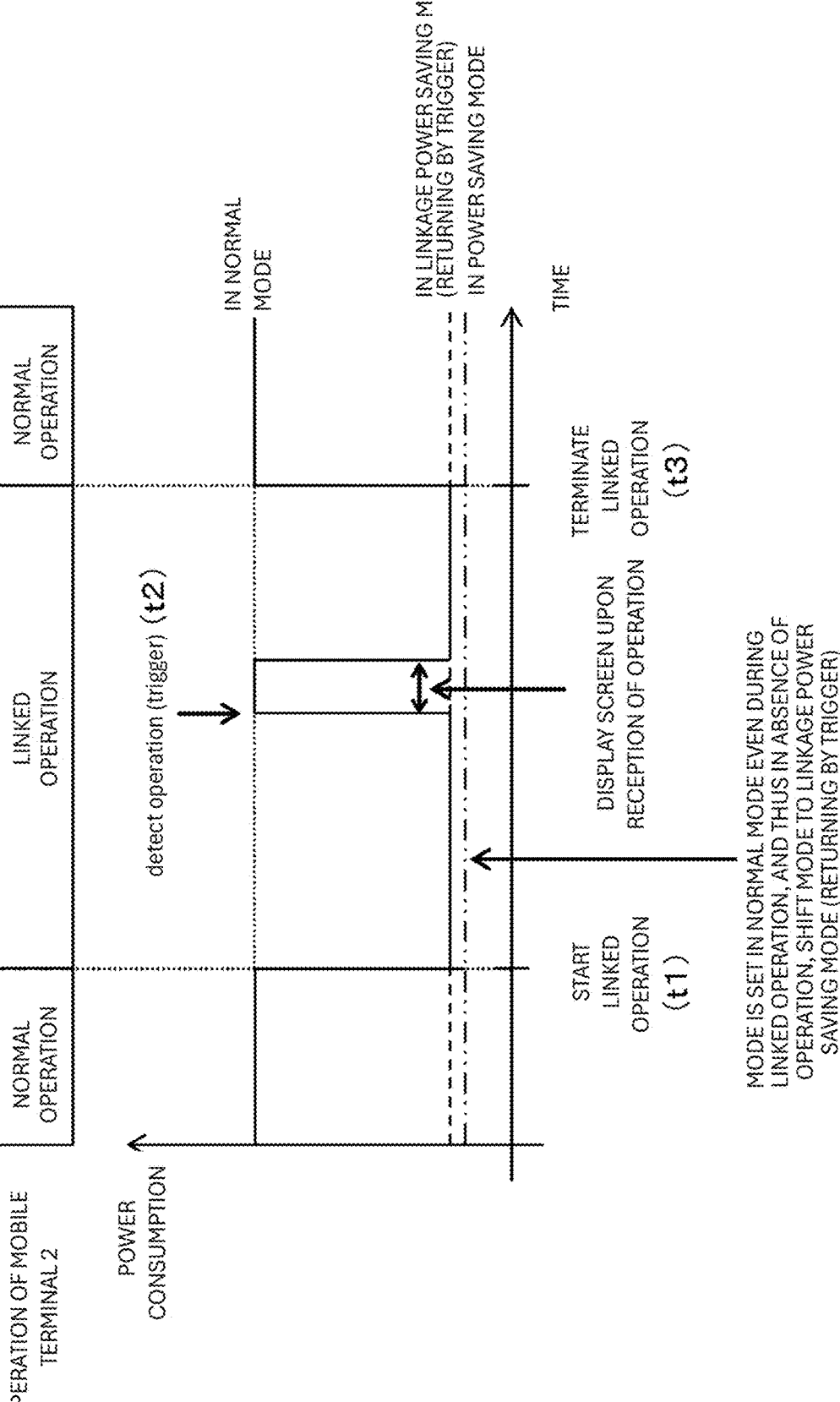
FIG. 14 illustrates relation between an operation of a mobile terminal and power consumption according to the second embodiment.
Figure 15:
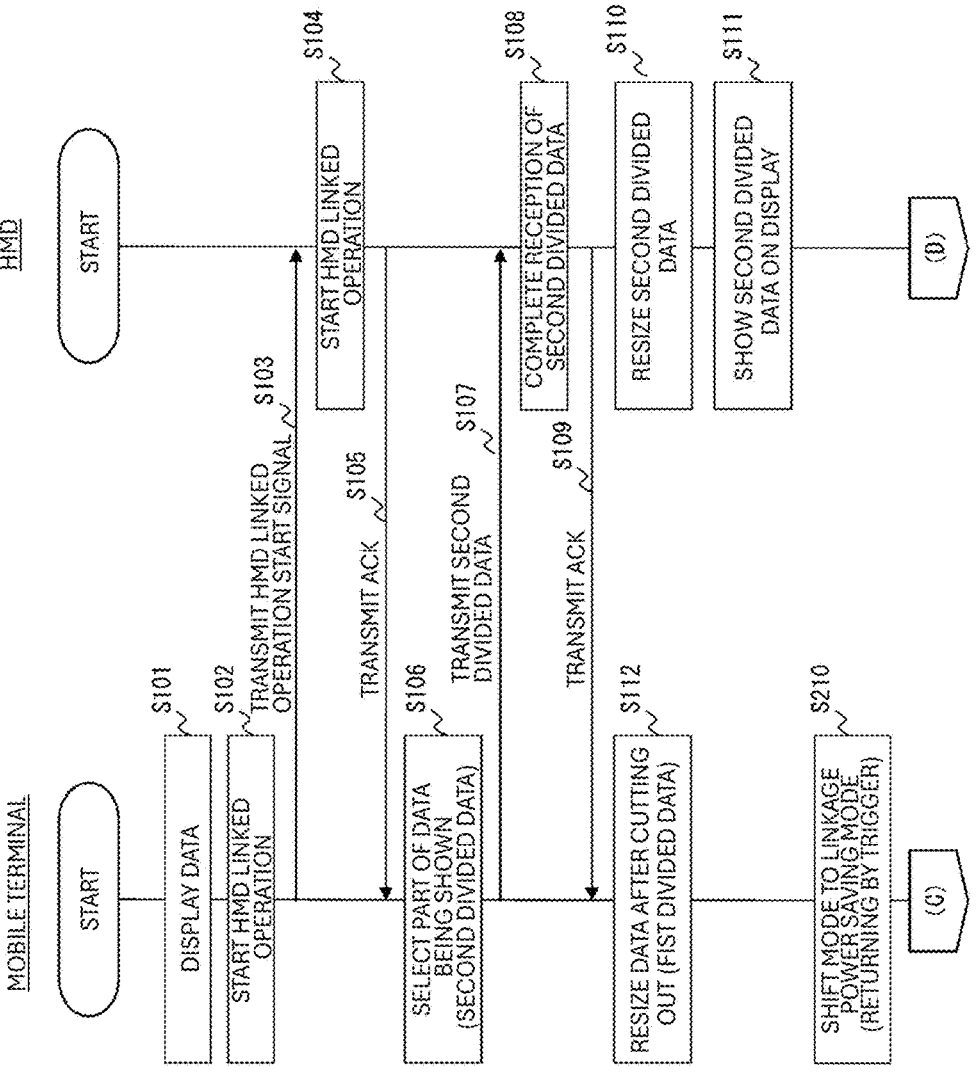
FIG. 15 is a control flow diagram (first half) of a linked display system according to the second embodiment.
Figure 16:
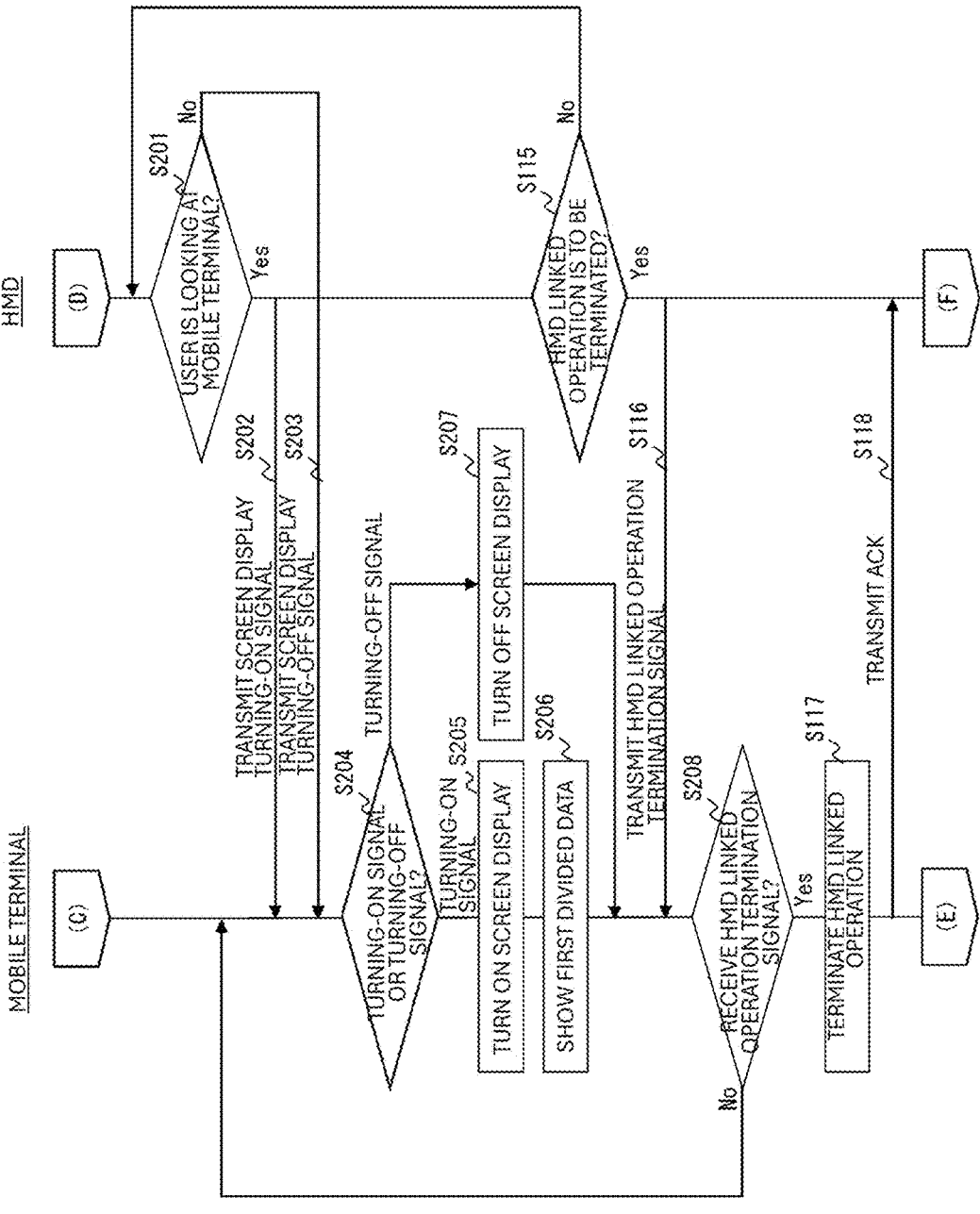
FIG. 16 is a control flow diagram (middle) of a linked display system according to the second embodiment.

In the following, the processing of the linked display system according to the second embodiment will be described with reference to FIG. 14 to FIG. 17. FIG. 14 illustrates the relation between an operation of a mobile terminal and power consumption according to the second embodiment. FIG. 15 is a control flow diagram (first half) of the linked display system according to the second embodiment. FIG. 16 is a control flow diagram (middle) of the linked display system according to the second embodiment. FIG. 17 is a control flow diagram (second half) of the linked display system according to the second embodiment.

As illustrated in FIG. 14, in the second embodiment, the mode of the mobile terminal 2 is shifted to the linkage power saving mode (returning by trigger) and the screen display of the mobile terminal 2 is turned off when a linked operation between the mobile terminal 2 and the HMD 3 starts at the time t1 while the mobile terminal 2 is operating in the normal operation, in other words, when the mobile terminal 2 receives an acknowledgement in response to an HMD linked operation start signal after device-to-device connection is established. The start of the linked operation and the shift to the linkage power saving mode (returning by trigger) may not occur at the same time.

The HMD 3 detects an operation at a time t2 by means of, for example, a gesture operation, which causes, as a trigger, the screen of the mobile terminal 2 that has been turned off to be turned on. Thereafter, the screen display is turned off if any operation is not performed to the mobile terminal 2 for a certain period of time. Switching the screen display from an on-state to an off-state is carried out in the same manner as the standard operation for the power saving mode.

Upon termination of the linked operation at the time t3, the mode is switched to the normal mode with the linkage power saving mode (returning by trigger) being enabled, and the mobile terminal 2 performs a normal operation. Thus, the linked operation causes the linkage power saving mode (returning by trigger) to be enabled and the screen display to be turned off, which makes the time during which the screen display is being turned on short and thus suppresses the power consumption. Furthermore, detection of an operation serves as a trigger and causes the screen display to be turned on, which also prevents reduction in the operation efficiency.

As illustrated in FIG. 15, steps S101 to S112 are the same processes as those in the first embodiment, and accordingly, repetitive explanation therefor will be omitted herein. The operation mode control section 252*d* of the mobile terminal 2 shifts the mode to the linkage power saving mode (returning by trigger) (S210).

As illustrated in FIG. 16, the second linked display section 352*a* transmits a screen display turning-on signal to the mobile terminal 2 (S202) when it is determined that the user 1 is looking at the mobile terminal 2 (S201: Yes).

On the other hand, when it is determined that the user 1 is not looking at the mobile terminal 2 (S201: No), the second linked display section 352*a* transmits a screen display turning-off signal to the mobile terminal 2 (S203).

In the mobile terminal 2, upon receiving the screen display turning-on signal (S204: turning-on signal), the first linked display section 252*a* turns on the screen display of the display 207 (S205), and displays the first divided data (S206).

On the other hand, in the mobile terminal 2, upon receiving the screen display turning-off signal (S204: turning-off signal), the first linked display section 252*a* turns off the screen display of the display 207 (S207).

The mobile terminal 2 returns to step S204 and repeats the processing until it receives the HMD linked operation termination signal from the HMD 3 (S208: No).

The HMD 3 returns to step S201 and repeats the processing until it receives an instruction to terminate the HMD linked operation, which is to be input by means of a gesture input or a line-of-sight input (S115: No).

Upon receiving an instruction to terminate the HMD linked operation by means of a gesture input or a line-of-sight input (S115: Yes), the HMD 3 transmits a linked operation termination signal to the mobile terminal 2 (S116).

Upon receiving the linked operation termination signal (S208: Yes), the mobile terminal 2 terminates the HMD linked operation (S117) and the first linked display section 252*a* returns an acknowledgement (S118).

As illustrated in FIG. 17, upon termination of the linked operation, the mobile terminal 2 turns on the screen display of the display 207 (S209) and clears the first divided data that has been shown (has been left on the display 207) (S119), and the first display control section 251*b* shows the original data on the display 207 again (S120). Then, the operation mode control section 252*d* cancels the linkage power saving mode (returning by trigger) (S211). This causes the mode of the mobile terminal 2 to be shifted to the normal mode.

Upon receiving the acknowledgement transmitted in step S118, the HMD 3 clears the second divided data being shown on the display 307 (S122).

Figures 18A, 18B:
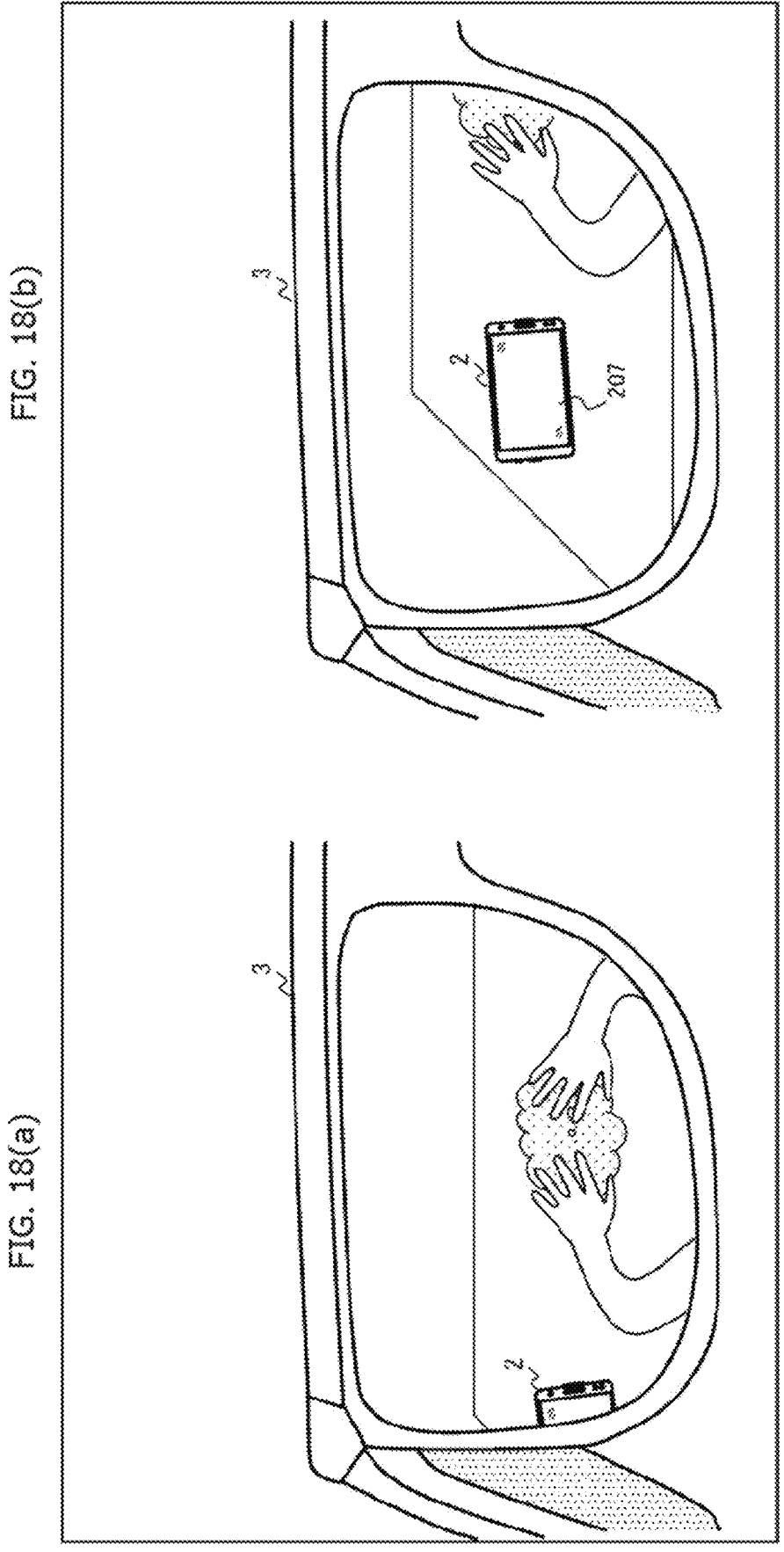
FIGS. 18(*a*) and 18(*b*) illustrate a line of sight of a user when the user is about to turn on a screen using a trigger in a linked display system, in which FIG. 18(*a*) illustrates a field of view through a display of an HMD while the user 1 is not looking at a screen of a mobile terminal from the front, and FIG. 18(*b*) illustrates a field of view through a display of an HMD while the user is looking at a screen of a mobile terminal from the front.

FIG. 18 illustrates a line of sight of a user when the user is about to turn on the screen using a trigger in the linked display system, in which FIG. 18(*a*) illustrates a field of view through the display 307 of the HMD 3 while the user 1 is not looking at the screen of the mobile terminal 2 from the front, and FIG. 18(*b*) illustrates a field of view through the display 307 of the HMD 3 while the user 1 is looking at the screen of the mobile terminal 2 from the front.

In FIG. 18(*a*), the mobile terminal 2 is in the left corner of the field of view of the user 1, however, the user 1 is not looking at the mobile terminal 2 from the front. Accordingly, the screen display turning-on signal (trigger signal) is not output.

In FIG. 18(*b*), the display 207 of the mobile terminal 2 is in the center of the field of view of the user 1 with directly facing the user 1, and thus it is determined that the user 1 is looking at the mobile terminal 2 from the front. Accordingly, the screen display turning-on signal (trigger signal) is output.

The second image recognition section 352*c* carries out an image recognition process on an image captured by the out-camera 305 for making determination as to which of the states illustrated in FIG. 18(*a*) and FIG. 18(*b*) the current state corresponds to. The second image recognition section 352*c* recognizes the type of a subject to recognize whether the mobile terminal 2 is in the image (corresponding to the recognition by the first information device image), and further determines whether the captured image of the mobile terminal 2 directly faces the HMD 3 near the center of the image captured by the out-camera 305.

According to the second embodiment, the screen display is tuned on only when the user 1 looks at the screen of the mobile terminal 2 while the mobile terminal 2 and the HMD 3 are linked to each other, which enables the user 1 to see the first divided data without operating the mobile terminal 2. In addition, the screen display is turned off while the user 1 is not looking at the screen of the mobile terminal 2, which enables reduction in the power consumption during linkage more than that in the first embodiment for constantly turning on the screen display.

Furthermore, showing the second divided data on the HMD 3 enables the user 1 to see it without hardly moving his or her line-of-sight while performing the work at hand, and therefore, improvement in the work efficiency can be expected.

Third Embodiment

The third embodiment is an embodiment for keeping the power saving mode enabled while the mobile terminal 2 and the HMD 3 are linked to each other, and upon detection of a trigger by the mobile terminal 2, making the mobile terminal 2 operate in the normal mode with the screen thereof being turned on. In typical cases, the mode of the mobile terminal 2 is switched to the power saving mode in absence of any operation performed thereto for a predetermined time period during execution of the normal mode. However, in the second embodiment and also the third embodiment, start of the linked operation causes shift of the mode from the normal mode to the linkage power saving mode (returning by trigger). Here, the third embodiment differs from the second embodiment in that the mobile terminal 2 detects a trigger while, in the second embodiment, the HMD 3 detects a trigger.

Figure 19:
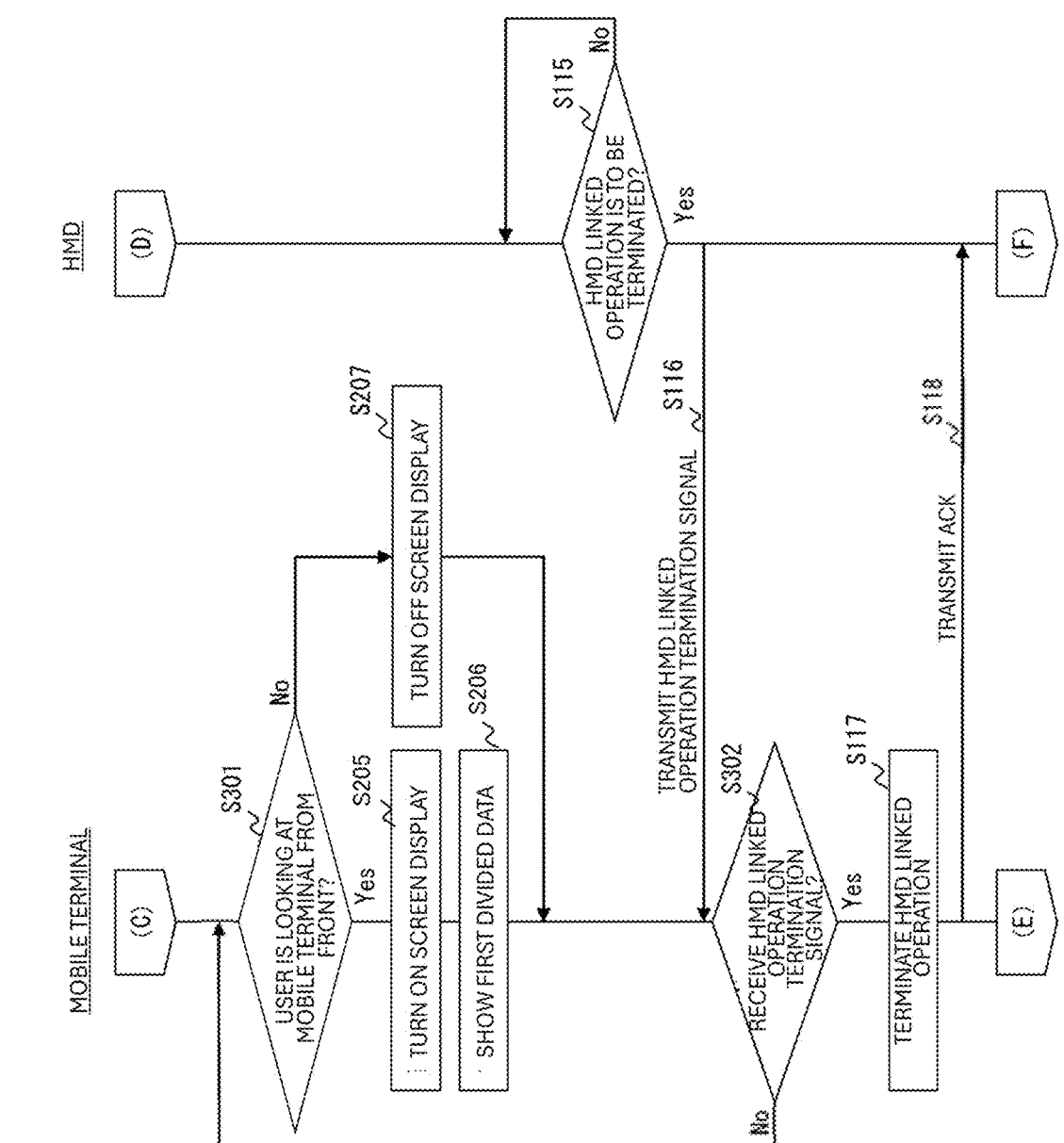
FIG. 19 is a control flow diagram of a linked display system according to the third embodiment.

Referring to FIG. 19, the processing of the linked display system according to the third embodiment will be described. FIG. 19 is a control flow diagram of the linked display system according to the third embodiment.

The processes from step S101 to step S112 and step S210 (see FIG. 15) are the same processes as those in the second embodiment, and accordingly, repetitive explanation therefor will be omitted herein.

In FIG. 19, the first image recognition section 252c of the mobile terminal 2 carries out an image recognition process on an image captured by the in-camera 206 to recognize the face of the user 1. When it is determined that the user 1 is looking at the mobile terminal 2 from the front based on the size of a face image of the user 1 and the direction of the face (S301: Yes), the first linked display section 252a turns on the screen display of the display 207 (S205) and shows the first divided data (S206).

On the other hand, when it is determined that the user 1 is not looking at the mobile terminal 2 from the front (S301: No), the first linked display section 252a turns off the screen display of the display 207 (S207).

The first linked display section 252a may determine that the user 1 is looking at the mobile terminal 2 from the front if, for example, the first image recognition section 252c can recognize both the eyes based on the image captured by the in-camera 206.

In absence of reception of the HMD linked operation termination signal (S302: No), the first linked display section 252a returns to step S301.

Upon reception of the HMD linked operation termination signal (S302: Yes), the mobile terminal 2 carries out the processing which is the same as that of the second embodiment, and thus repetitive explanation therefor will be omitted herein.

According to the third embodiment, the screen display is tuned on only when the user 1 looks at the screen of the mobile terminal 2 while the mobile terminal 2 and the HMD 3 are linked to each other, which enables the user 1 to watch the first divided data without operating the mobile terminal 2.

The HMD 3 is preferably light in weight considering its characteristic of being mounted on the head, and thus a large-capacity battery is rarely mounted thereto. According to the third embodiment, however, a trigger is detected by the mobile terminal 2, which makes it unnecessary for the HMD 3 to detect a trigger for the process of switching the screen display of the mobile terminal 2 between turning-on and turning-off and transmit the screen display turning-on signal and the screen display turning-off signal to the mobile terminal 2. This enables reduction in the power consumption in the HMD 3 more than that in the second embodiment.

Furthermore, showing the second divided data on the HMD 3 enables the user 1 to see it without hardly moving his or her line-of-sight while performing the work at hand, and therefore, improvement in the work efficiency can be expected.

Fourth Embodiment

The fourth embodiment is an embodiment for constantly turning on the screen display of the mobile terminal 2 while the mobile terminal 2 and the HMD 3 are linked with each other, and also making the mobile terminal 2 operate in the linkage power saving mode (constantly turning on screen).

Figure 20:
FIG. 20 illustrates relation between an operation of a mobile terminal and power consumption according to the fourth embodiment.
Figure 21:
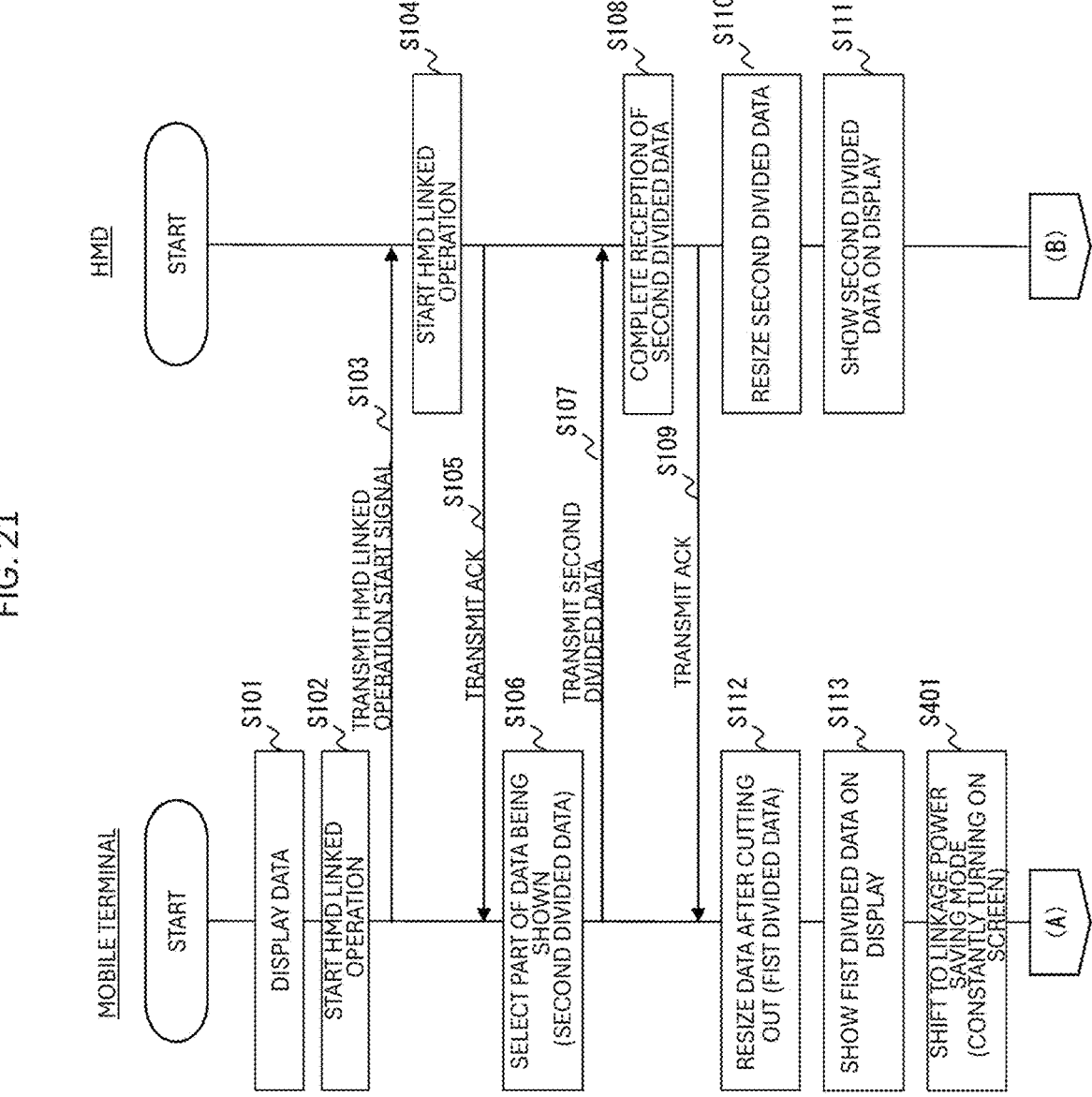
FIG. 21 is a control flow diagram (first half) of a linked display system according to the fourth embodiment.
Figure 22:
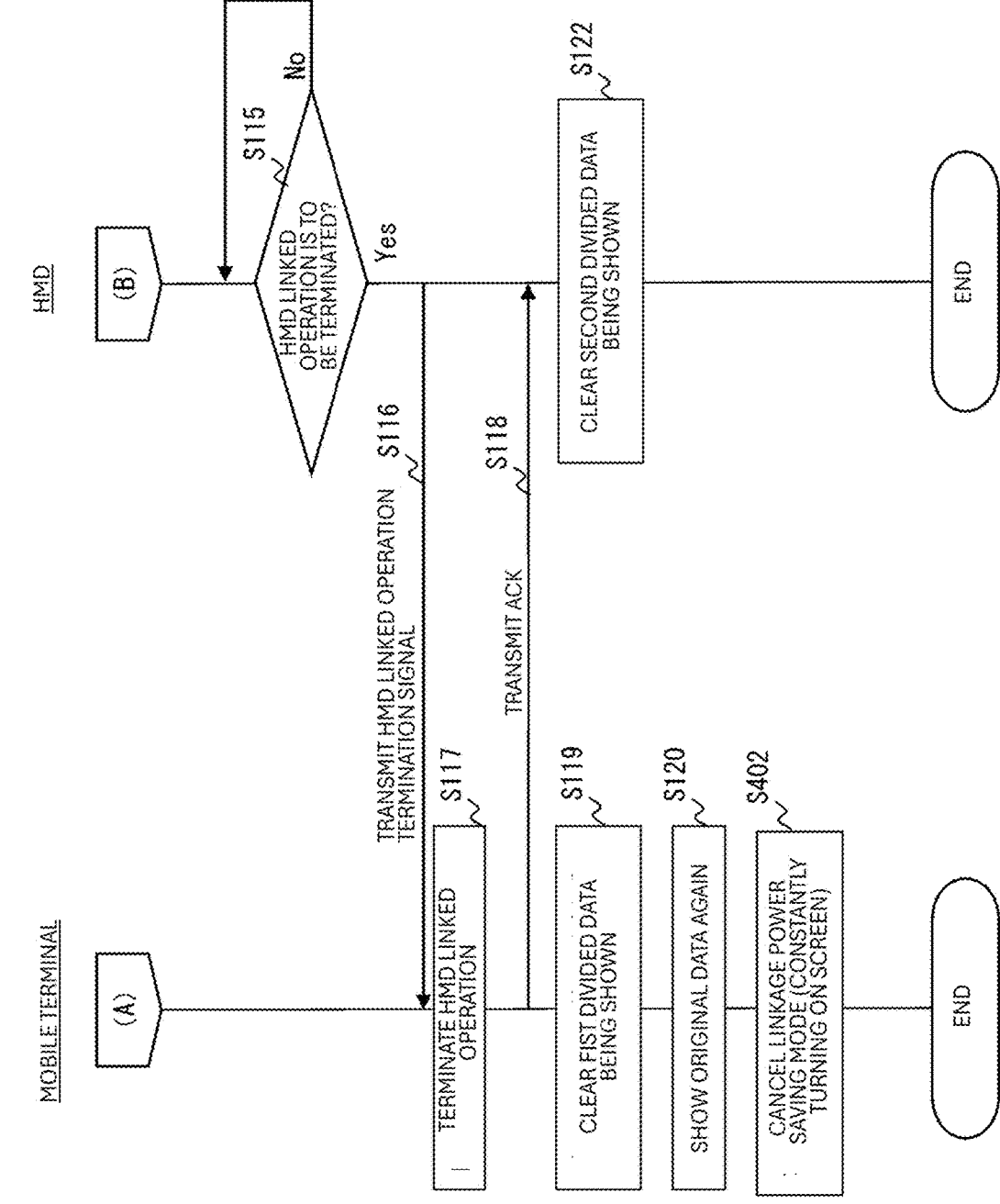
FIG. 22 is a control flow diagram (second half) of a linked display system according to the fourth embodiment.

In the following, referring to FIG. 20 to FIG. 22, the processing of the linked display system according to the fourth embodiment will be described. FIG. 20 illustrates the relation between an operation of the mobile terminal and power consumption according to the fourth embodiment. FIG. 21 is a control flow diagram (first half) of the linked display system according to the fourth embodiment. FIG. 22 is a control flow diagram (second half) of the linked display system according to the fourth embodiment.

As illustrated in FIG. 20, in the fourth embodiment, transition to the linkage power saving mode (constantly turning on screen) occurs in the mobile terminal 2, and the mode thereof is shifted to the linkage power saving mode, when a linked operation between the mobile terminal 2 and the HMD 3 starts at the time t1 while the mobile terminal 2 is operating in the normal operation, in other words, when the mobile terminal 2 receives an acknowledgement in response to an HMD linked operation start signal after device-to-device connection is established. This causes the screen display of the mobile terminal 2 to be constantly turned on.

Upon termination of the linked operation at the time t3, the mode is switched to the normal mode and the mobile terminal 2 performs a normal operation. Thus, the linked operation causes shift of the mode of the mobile terminal 2 to the linkage power saving mode (constantly turning on screen) with the power consumption being less than that of the normal mode. This enables reduction in the power consumption although the screen display is constantly turned on, whereby reduction in the operation efficiency can be prevented.

As illustrated in FIG. 21, the processes from step S101 to step S113 are the same processes as those in the first embodiment, and accordingly, repetitive explanation therefor will be omitted herein.

The operation mode control section 252d of the mobile terminal 2 shifts the mode to the linkage power saving mode (constantly turning on screen) (S401).

As illustrated in FIG. 22, the second linked display section 352a of the HMD 3 continues the linked display until the HMD linked operation is terminated (S115: No).

On the other hand, upon receiving an instruction to terminate the HMD linked operation by means of a gesture input or a line-of-sight input (S115: Yes), the HMD 3 transmits the linked operation termination signal to the mobile terminal 2 (S116).

Upon receiving the linked operation termination signal, the mobile terminal 2 terminates the linked operation (S117). The first linked display section 252a returns an acknowledgement (S118) and clears the first divided data as being shown (S119), and the first display control section 251b displays the original data on the display 207 again (S120). Then, the operation mode control section 252d cancels the linkage power saving mode (constantly turning on screen) (S402). This causes shift of the mode of the mobile terminal 2 to the normal mode.

In the mobile terminal 2, during the linkage power saving mode (constantly turning on screen), the functions of screen display, voice search, wireless telephone, and BT communication are available, however, for example, the functions of applications, data synchronization, Wi-Fi, acquisition of position data, and the like are stopped. This enables reduction in the power consumption more than that in the normal mode.

Furthermore, the screen of the mobile terminal 2 is constantly turned on regardless of whether an operation is made for the mobile terminal 2, which allows the user 1 to watch the first divided data being shown on the screen anytime he or she sees the screen of the mobile terminal 2 during linkage, without operating the mobile terminal 2.

Furthermore, showing the second divided data on the HMD 3 enables the user 1 to see it without hardly moving his or her line-of-sight while performing the work at hand, and therefore, improvement in the work efficiency can be expected.

Fifth Embodiment

The fifth embodiment is an embodiment for displaying data including only images on the mobile terminal 2 and the HMD 3 which are linked with each other.

Figure 23A:
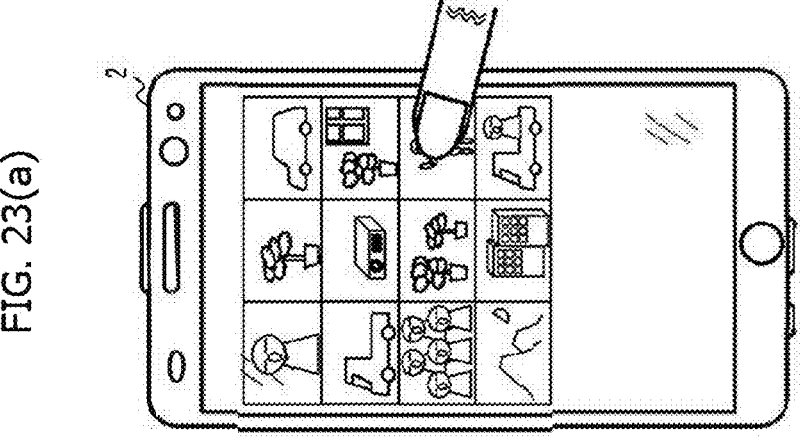
FIGS. 23(*a*), 23(*b*-1), and 23(*b*-2) illustrate an example of a data display screen according to the fifth embodiment, in which FIG. 23(*a*) illustrates a screen of a mobile terminal before linkage, FIG. 23(*b*-1) illustrates a screen of an HMD after linkage, and FIG. 23(*b*-2) illustrates a screen of a mobile terminal after linkage.

FIG. 23 illustrates an example of a data display screen according to the fifth embodiment, in which FIG. 23(*a*) illustrates a screen of the mobile terminal 2 before linkage, FIG. 23(*b*-1) illustrates a screen of the HMD 3 after linkage, and FIG. 23(*b*-2) illustrates a screen of the mobile terminal 2 after linkage.

Before linkage, a plurality of thumbnail images is shown on the screen of the mobile terminal 2 (see FIG. 23(*a*)). The user 1 selects an image on the touch panel 208 to designate data to be transmitted to the HMD 3. Alternatively, the order of displaying the images may be set in advance at the time of creating the data so that the first image can be transmitted to the HMD 3.

After linkage, in the HMD 3, the data is shown with its size being enlarged (optimized) to fit the size of the screen (see FIG. 23(*b*-1)). On the screen of the mobile terminal 2, the thumbnail image corresponding to the selected image is provided with a mark superimposed thereon and indicating that it is being selected (see FIG. 23(*b*-2)).

During linkage, the user 1 may change the data being shown on the HMD 3 by moving his or her line of sight on the HMD 3. For example, the user 1 may change the data being shown to the next data by blinking twice.

Figure 24:
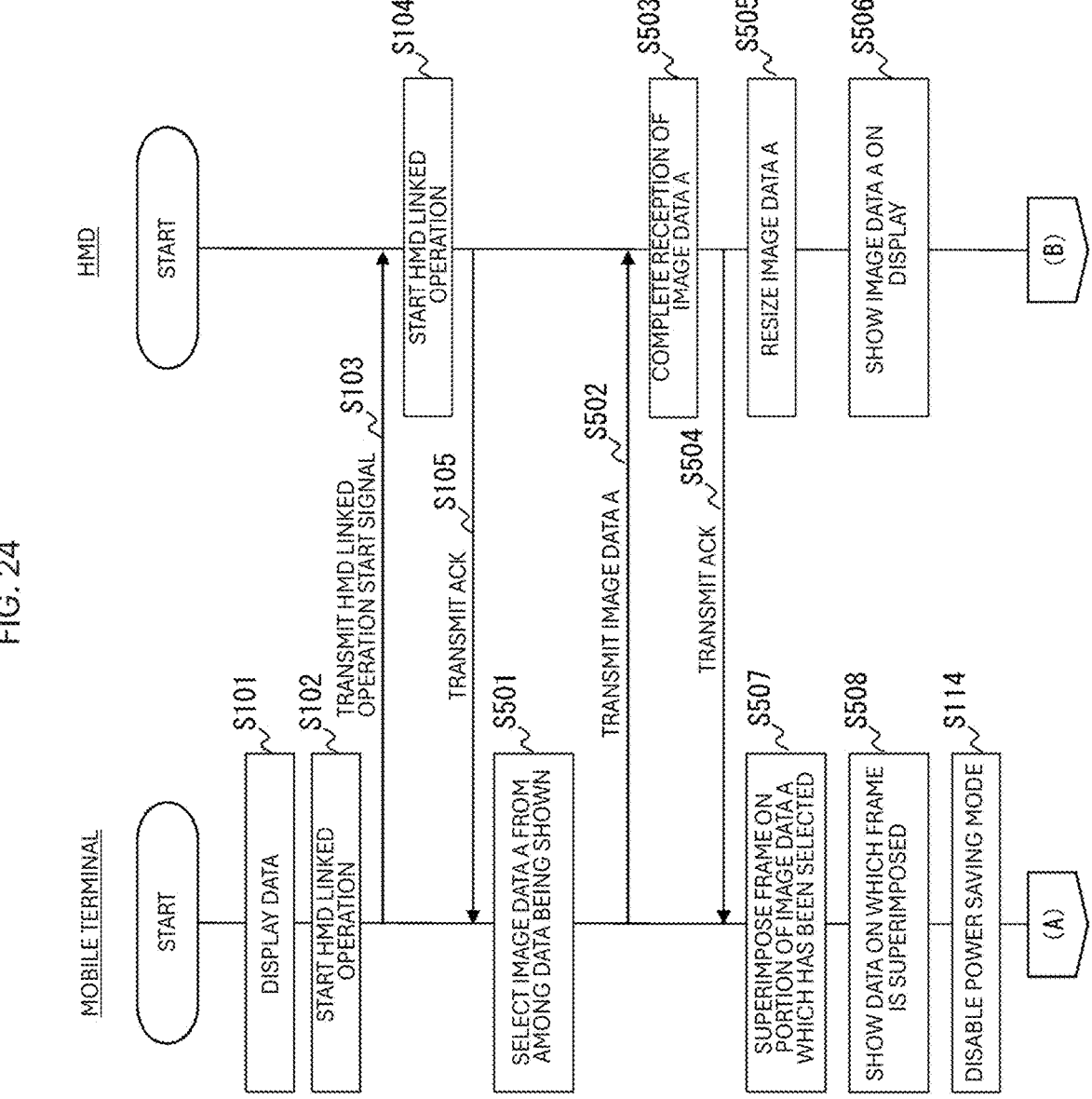
FIG. 24 is a control flow diagram of a flow of processing according to the fifth embodiment.

FIG. 24 is a control flow diagram of a flow of the processing according to the fifth embodiment.

After the linkage connection is established from step S101 to step S105, image data A is selected from among the thumbnail images being shown on the screen of the mobile terminal 2 (S501), and the selected data is transmitted to the HMD 3 (S502).

The HMD 3 receives the image data A (S503), and returns an acknowledgement (S504).

The HMD 3 resizes the image data A (S505) to show it on the display 307 (S506).

Upon receiving the acknowledgement transmitted in step S504, the mobile terminal 2 superimposes a frame on the portion corresponding to the image data A (S507), shows the image data A on which the frame has been superimposed on the display 207 (S508), and disables the power saving mode (S114). The processes thereafter are the same as those illustrated in FIG. 13, and accordingly, repetitive explanation therefor will be omitted herein.

According to the present embodiment, during linkage between the mobile terminal 2 and the HMD 3, selecting one of the thumbnail images being shown on the mobile terminal 2 and enlarging and showing the selected image on the HMD 3 enables the user 1 to easily see the image data A that he or she wishes to watch.

Sixth Embodiment

The sixth embodiment is an embodiment for displaying one image and image data which is a part of the image on the mobile terminal 2 and the HMD 3 which are linked with each other.

Figure 25A:
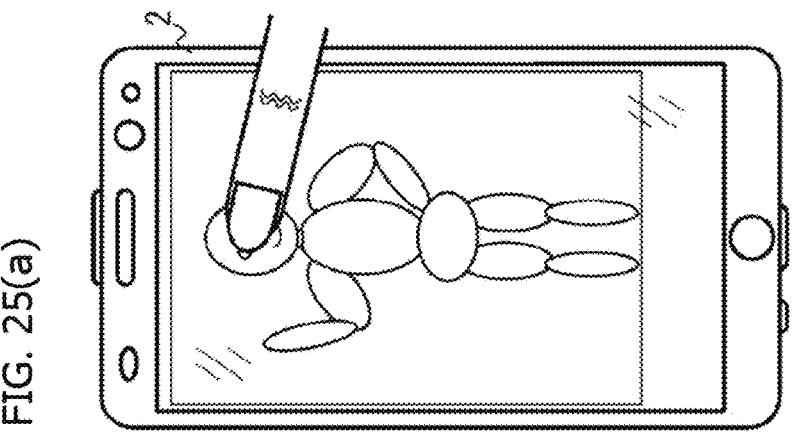
FIGS. 25(*a*), 25(*b*-1), and 25(*b*-2) illustrate an example of a data display screen according to the sixth embodiment, in which FIG. 25(*a*) illustrates a screen of a mobile terminal before linkage, FIG. 25(*b*-1) illustrates a screen of an HMD after linkage, and FIG. 25(*b*-2) illustrates a screen of a mobile terminal after linkage.

FIG. 25 illustrates an example of a data display screen according to the sixth embodiment, in which FIG. 25(*a*) illustrates a screen of the mobile terminal 2 before linkage, FIG. 25(*b*-1) illustrates a screen of the HMD 3 after linkage, and FIG. 25(*b*-2) illustrates a screen of the mobile terminal 2 after linkage.

Before linkage, the user 1 can specify an area to be enlarged on the touch panel 208 to designate HMD transmission data. Alternatively, an area that can be enlarged may be set in advance at the time of creating the data so that the user 1 can designate the HMD transmission data by performing a touch operation. The user 1 may also designate an area using his or her line of sight through the HMD 3.

After linkage, on the display 207 of the mobile terminal 2, the enlarged portion of the original image is provided with a mark which is superimposed thereon (see FIG. 25(*b*-2)).

In the HMD 3, the data is shown with its size being enlarged (optimized) to fit the size of the screen (see FIG. 25(*b*-1)).

The user 1 can change the data being shown on the HMD 3 by moving his or her line of sight on the HMD 3. For example, the user 1 can change the data being shown to the next data, change a portion to be enlarged, change the magnification, or the like by blinking twice.

Figure 26:
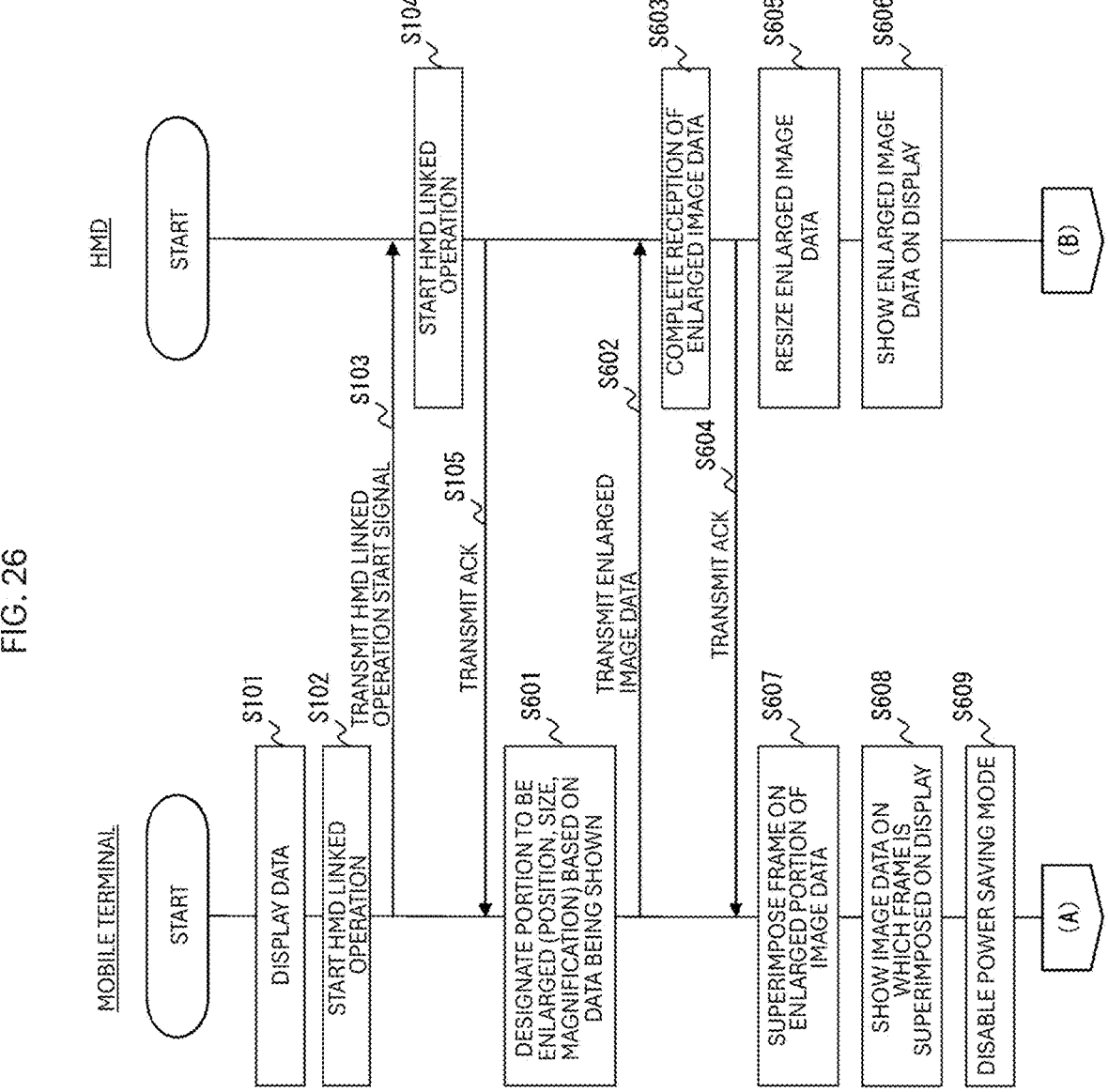
FIG. 26 is a control flow diagram of a flow of processing according to the sixth embodiment.

FIG. 26 is a control flow diagram of a flow of the processing according to the sixth embodiment.

After the linkage connection is established from step S101 to step S105, within an image being shown on the screen of the mobile terminal 2, an area to be enlarged is specified to designate enlarged image data (S601), and the enlarged image data is transmitted to the HMD 3 (S602).

The HMD 3 receives the enlarged image data (S603), and returns an acknowledgement (S604).

The HMD 3 resizes the enlarged image data (S605) to show it on the display 307 (S606).

Upon receiving the acknowledgement transmitted in step S604, the mobile terminal 2 superimposes a frame on the enlarged portion of the image data (S607), shows the image data on which the frame has been superimposed on the display 207 (S608), and disables the power saving mode (S609). The processes thereafter are the same as those illustrated in FIG. 13, and accordingly, repetitive explanation therefor will be omitted herein.

According to the present embodiment, during linkage between the mobile terminal 2 and the HMD 3, designating a part of an image being shown on the mobile terminal 2 and enlarging and showing it on the HMD 3 enables the user 1 to easily see a portion that he or she wishes to watch.

Seventh Embodiment

The seventh embodiment is an embodiment relating to a variation of an operation example for the HMD 3. The operation example according to the present embodiment may be used in the first to sixth embodiments as appropriate.

The HMD 3 does not necessarily have to be operated by line-of-sight sensing. For example, it may be operated by audio input, gesture input, tapping of a frame, or the like.

Furthermore, the data does not necessarily have to be divided into two. It may be divided into three or more so that the divided pieces of data are transmitted to the HMD 3 and shown in parallel on the display 307. Alternatively, the divided pieces of data may be shown sequentially on the display 307.

Still further, it may be configured that, when the user 1 looks at the image being shown on the mobile terminal 2 through the HMD 3, the data being shown on the HMD 3 moves near the screen of the mobile terminal 2.

Still further, a line-of-sight operation may be used for operating a "video" in the case where it is included in the data being shown on the screen of the mobile terminal 2.

Figure 27:
FIG. 27 illustrates an example of operating a video being shown on a mobile terminal, using a line-of-sight.

FIG. 27 illustrates an example of operating a video being shown on the mobile terminal 2, using a line-of-sight.

In the state in which the video is being shown on the mobile terminal 2 and the text or the like is being shown on the HMD 3, the video may be operated using the position of a gaze point and the time during which the gaze point stays. An action in which the user 1 keeps watching a certain point for a predetermined period of time with his or her line of sight meeting the mobile terminal 2 may be used for playing the video.

Furthermore, while the user 1 is viewing the mobile terminal 2 through the HMD 3 with his or her line-of-sight meeting the mobile terminal 2, his or her action of moving the line of sight to the left may be set to a rewinding operation and action of moving the line of sight to the right may be set to a fast-forwarding operation.

Still further, an action of keeping watching a point other than the mobile terminal 2 through the HMD 3 for a predetermined period of time may be used as an operation for stopping the video. Still further, in the HMD 3, the operations for a video may be customized so as to correspond to user operations.

Upon detection of an operation corresponding to the movement of the line of sight, the processor 301 of the HMD 3 generates an instruction signal indicative of the content of the operation and transmits it to the mobile terminal 2. Upon receiving the instruction signal, the mobile terminal 2 operates the video being shown on the display 207 of the mobile terminal 2 in accordance with the operation content indicated in the instruction signal, and the text and the like being shown on the HMD 3 changes in accordance therewith.

According to the present embodiment, during linkage between the mobile terminal 2 and the HMD 3, using a line-of-sight input enables playing, fast-forwarding, rewinding, and stopping of a video being shown on the HMD 3. This allows the user 1 who is even in a situation where he or she is unable to leave the work at hand to operate a video without operating the mobile terminal 2 by hand.

In the above, the present invention made by the inventors has been described in detail referring to the embodiments. However, the present invention is not limited to the embodiments described above and can be modified in various ways unless it departs from the concept thereof.

For example, the first information device may be a tablet terminal instead of a smartphone, and the second information device may be a smart glass instead of a head mounted display.

Furthermore, a trigger event for resuming the screen display of the mobile terminal 2 is not limited to an event of recognizing the face image of the user 1 based on the image captured by the in-camera 206 of the mobile terminal 2, nor an event of recognizing the mobile terminal image based on the image captured by the out-camera 305 of the HMD 3 to determine that the line of sight of the user 1 overlaps the mobile terminal image. For example, it may be configured to show a linked page on the display 207 of the mobile terminal 2 in response to an event that the user 1 blinks twice with making the line-of-sight overlap a link address which is being shown on the display 307 of the HMD 3. Still further, audio recognition of a speech such as "turn on the screen" uttered by the user 1 may be used as a trigger event.

The relevant data transmitted from the mobile terminal 2 to the HMD 3 is not limited to the image corresponding to one of the thumbnail images, the divided data of the pieces of data being shown on the mobile terminal 2, and text in a video. For example, showing a sentence in the first language on the display 207 of the mobile terminal 2 while showing a sentence obtained by translating the sentence into the second language on the HMD 3 as the relevant data is a possible scenario.

For example, the present invention includes any combination of the embodiment described above. Furthermore, the present invention includes variations in which further functions are added to the embodiments described above.

The numerical values and messages appearing in the text and drawings are merely examples. The advantageous effects of the present invention are not impaired even if different ones are used.

Each of the programs described in the examples of the processing may be an independent program, or a plurality of programs configuring one application program. The orders of execution of the processes may be changed.

Some or all the functions and the like of the present invention may be implemented by hardware, for example, by designing them with integrated circuitry. Still further, a processor unit or the like may interpret and execute an operation program for implementing the functions and the like of the present invention, whereby the functions can be implemented by software. Hardware and software may be used in combination.

The control lines and information lines which are considered to be necessary for the purpose of explanation are indicated herein, but not all the control lines and information lines of actual products are necessarily indicated. It may be considered that almost all the components are actually connected to each other.

The embodiments described above include the following aspects.

First Aspect

A linked display system comprising:
a first information device; and
a second information device,
the first information device and the second information device being connected so as to communicate with each other,
the first information device including a first display, a first communication device configured to transmit and receive data to and from the second information device, and a first processor configured to control the first display and the first communication device,
the second information device including a second display, a second communication device configured to transmit and receive data to and from the first information device, and a second processor configured to control the second display and the second communication device,
the first information device having a normal mode and a power saving mode, the normal mode being for turning on a screen display of the first display and maintaining device-to-device communication with the second information device, and the power saving mode being for turning off the screen display of the first display when no operation is performed on the first information device for a predetermined period of time or longer,
the first information device being configured to:

upon start of a linked operation between the first information device and the second information device, disable the power saving mode of the first information device and switch the screen display of the first display to be constantly turned on;

transmit second divided data including a part of data for display to be shown on the first display to the second information device; and show, on the first display, first divided data that remains after the second divided data is cut out from the data for display, and the second information device being configured to, upon receiving the second divided data, show the second divided data on the second display.

Second Aspect

A linked display system comprising:
a first information device; and
a second information device,
the first information device and the second information device being connected so as to communicate with each other,
the first information device including a first display, a first communication device configured to transmit and receive data to and from the second information device, and a first processor configured to control the first display and the first communication device,
the second information device including a second display, a second communication device configured to transmit and receive data to and from the first information device, and a second processor configured to control the second display and the second communication device,
the first information device having a normal mode and a first linkage power saving mode, the normal mode being for turning on a screen display of the first display and maintaining device-to-device communication with the second information device, and the first linkage power saving mode being for turning off the screen display of the first display when no operation is performed on the first information device for a predetermined period of time or longer,
the first information device being configured to:
upon start of a linked operation between the first information device and the second information device,
enable the first linkage power saving mode of the first information device;
while the screen display of the first display is being turned off, upon receiving a trigger signal for turning on the screen display, transmit second divided data including a part of data for display to be shown on the first display to the second information device;
show, on the first display, first divided data that remains after the second divided data is cut out from the data for display; and
while the screen display of the first display is being turned off, upon receiving a trigger signal for turning on the screen display, turn on the screen display of the first display, and
the second information device being configured to, upon receiving the second divided data, show the second divided data on the second display.

Third Aspect

A linked display system comprising:
a first information device; and a second information device,
the first information device and the second information device being connected so as to communicate with each other,
the first information device including a first display, a first communication device configured to transmit and receive data to and from the second information device, and a first processor configured to control the first display and the first communication device,
the second information device including a second display, a second communication device configured to transmit and receive data to and from the first information device, and a second processor configured to control the second display and the second communication device,
the first information device having a normal mode and a second linkage power saving mode, the normal mode being for turning on a screen display of the first display and maintaining device-to-device communication with the second information device, and the second linkage power saving mode being for constantly turning on the first display and turning off other predetermined functions so as to operate with less power consumption than that in the normal mode,
the first information device being configured to:
upon start of a linked operation between the first information device and the second information device,
switch a mode of the first information device to the second linkage power saving mode;
transmit second divided data including a part of data for display to be shown on the first display to the second information device; and
show, on the first display, first divided data that remains after the second divided data is cut out from the data for display, and
the second information device being configured to, upon receiving the second divided data, show the second divided data on the second display.

Fourth Aspect

A linked display method to be executed by a first information device and a second information device which are connected so as to communicate with each other, the method comprising:
starting a linked operation between the first information device and the second information device;
disabling a power saving mode of the first information device to switch a screen display of a first display provided in the first information device to be constantly turned on;
transmitting second divided data including a part of data for display to be shown on the first display to the second information device;
showing, on the first display, first divided data that remains after the second divided data is cut out from the data for display;
by the second information device, receiving the second divided data; and
by the second information device, showing the second divided data on a second display provided in the second information device.

REFERENCE SIGNS LIST

1: user
2: mobile terminal

21

3: HMD
5: network
6: WEB server
41: first data acquisition route
42: second data transfer route
43: third data acquisition route
201: processor
202: RAM
203: ROM
204: storage
205: out-camera
206: in-camera
207: display
208: touch panel
209: acceleration sensor
210: gyroscope sensor
211: geomagnetic sensor
212: positioning sensor
213: ranging sensor
214: telephone network communication I/F
215: LAN communication I/F
216: BT communication I/F
217: microphone
218: speaker
219: key-input I/F
220: battery
221: bus
230: home button
231: receiver
232: notification lamp
251: control program
251*a*: first communication control section
251*b*: first display control section
252: linked display application
252*a*: first linked display section
252*b*: first operation acceptance section
252*c*: first image recognition section
252*d*: operation mode control section
301: processor
302: RAM
303: ROM
304: storage
305: out-camera
306: in-camera
307: display
309: acceleration sensor
310: gyroscope sensor
311: geomagnetic sensor
312: positioning sensor
313: ranging sensor
315: LAN communication I/F
316: BT communication I/F
317: microphone
318: speaker
319: key-input I/F
319*a*: operating-key
320: battery
321: bus
330: frame
331: controller
351: control program
351*a*: second communication control section
351*b*: second display control section
352: linked display application
352*a*: second linked display section
352*b*: second operation acceptance section
352*c*: second image recognition section

352*d*: line-of-sight detection section

The invention claimed is:

1. A linked display system comprising:
a first information device; and
a second information device,
the first information device and the second information device being connected so as to communicate with each other,
the first information device including a first display, a first communication device configured to transmit and receive data to and from the second information device, and a first processor configured to control the first display and the first communication device,
the second information device including a second display, a second communication device configured to transmit and receive data to and from the first information device, and a second processor configured to control the second display and the second communication device,
the first information device having a normal mode and a power saving mode, the normal mode being for turning on a screen display of the first display and maintaining device-to-device communication with the second information device, and the power saving mode being for turning off the screen display of the first display when no operation is performed on the first information device for a predetermined period of time or longer,
the first information device being configured to:
upon start of a linked operation between the first information device and the second information device, disable the power saving mode of the first information device and switch the screen display of the first display to be constantly turned on;
transmit second divided data including a part of data for display to be shown on the first display to the second information device; and
show, on the first display, first divided data that remains after the second divided data is cut out from the data for display, and
the second information device being configured to, upon receiving the second divided data, show the second divided data on the second display.

2. The linked display system according to claim 1, wherein
the first display shows a plurality of thumbnail images,
upon accepting selection of at least one of the plurality of thumbnail images, the first processor transmits image data corresponding to the selected thumbnail image to the second information device, and
the second processor receives and shows, on the second display, the image data corresponding to the selected thumbnail image.

3. The linked display system according to claim 1, wherein
upon accepting selection of a partial area within an image being shown on the first display, the first processor transmits divided data within the area as selected to the second information device, and
the second processor receives and shows the divided data on the second display.

4. A linked display system comprising:
a first information device; and
a second information device,
the first information device and the second information device being connected so as to communicate with each other, the first information device including a first display, a first communication device configured to transmit and receive data to and from the second information device, and a first processor configured to control the first display and the first communication device, the second information device including a second display, a second communication device configured to transmit and receive data to and from the first information device, and a second processor configured to control the second display and the second communication device, the first information device having a normal mode and a first linkage power saving mode, the normal mode being for turning on a screen display of the first display and maintaining device-to-device communication with the second information device, and the first linkage power saving mode being for turning off the screen display of the first display when no operation is performed on the first information device for a predetermined period of time or longer, the first information device being configured to:

upon start of a linked operation between the first information device and the second information device, enable the first linkage power saving mode of the first information device;

transmit second divided data including a part of data for display to be shown on the first display to the second information device;

show, on the first display, first divided data that remains after the second divided data is cut out from the data for display; and while the screen display of the first display is being turned off, upon receiving a trigger signal for turning on the screen display, turn on the screen display of the first display, and the second information device being configured to, upon receiving the second divided data, show the second divided data on the second display.

5. The linked display system according to claim 4, wherein upon detecting a trigger event for turning on the screen display of the first display, the second information device transmits the trigger signal to the first information device.

6. The linked display system according to claim 4, wherein the second information device is a head mounted display or a smart glass including an out-camera for capturing an image of a real space and a line-of-sight sensor for detecting a line of sight of a user of the second information device, and the second processor carries out an image recognition process on the image captured by the out-camera to recognize a first information device image, and transmits the trigger signal to the first information device upon determining that the line of sight overlaps the first information device.

7. The linked display system according to claim 6, wherein in accordance with movement of the line-of-sight that has been determined as overlapping, the second processor generates an instruction signal for operating a video on the first display which includes a playing operation, a fast-forwarding operation, a rewinding operation, or a stopping operation, and transmits the instruction signal to the first information device, and the first information device operates the video based on the instruction signal.

8. The linked display system according to claim 4, wherein the first information device determines that the trigger signal has been input upon detecting a trigger event for turning on the screen display of the first display.

9. The linked display system according to claim 4, wherein the first information device is a mobile terminal further including an in-camera on a surface provided with the first display, and the first processor carries out an image recognition process on an image captured by the in-camera, and upon recognizing a face image of a user of the second information device, determines that a trigger signal has been input.

10. The linked display system according to claim 4, wherein the first display shows a plurality of thumbnail images, upon accepting selection of at least one of the plurality of thumbnail images, the first processor transmits image data corresponding to the selected thumbnail image to the second information device, and the second processor receives and shows, on the second display, the image data corresponding to the selected thumbnail image.

11. The linked display system according to claim 4, wherein upon accepting selection of a partial area within an image being shown on the first display, the first processor transmits divided data within the area as selected to the second information device, and the second processor receives and shows the divided data on the second display.

12. A linked display system comprising:

a first information device; and a second information device, the first information device and the second information device being connected so as to communicate with each other, the first information device including a first display, a first communication device configured to transmit and receive data to and from the second information device, and a first processor configured to control the first display and the first communication device, the second information device including a second display, a second communication device configured to transmit and receive data to and from the first information device, and a second processor configured to control the second display and the second communication device, the first information device having a normal mode and a second linkage power saving mode, the normal mode being for turning on a screen display of the first display and maintaining device-to-device communication with the second information device, and the second linkage power saving mode being for constantly turning on the first display and turning off other predetermined functions so as to operate with less power consumption than that in the normal mode, the first information device being configured to:

upon start of a linked operation between the first information device and the second information device, switch a mode of the first information device to the second linkage power saving mode;

transmit second divided data including a part of data for display to be shown on the first display to the second information device; and show, on the first display, first divided data that remains after the second divided data is cut out from the data for display, and the second information device being configured to, upon receiving the second divided data, show the second divided data on the second display.

13. The linked display system according to claim 12, wherein the first display shows a plurality of thumbnail images, upon accepting selection of at least one of the plurality of thumbnail images, the first processor transmits image data corresponding to the selected thumbnail image to the second information device, and the second processor receives and shows, on the second display, the image data corresponding to the selected thumbnail image.

14. The linked display system according to claim 12, wherein upon accepting selection of a partial area within an image being shown on the first display, the first processor transmits divided data within the area as selected to the second information device, and

the second processor receives and shows the divided data on the second display.

15. A linked display method to be executed by a first information device and a second information device which are connected so as to communicate with each other, the method comprising:

starting a linked operation between the first information device and the second information device;

disabling a power saving mode of the first information device to switch a screen display of a first display provided in the first information device to be constantly turned on;

transmitting second divided data including a part of data for display to be shown on the first display to the second information device;

showing, on the first display, first divided data that remains after the second divided data is cut out from the data for display;

by the second information device, receiving the second divided data; and by the second information device, showing the second divided data on a second display provided in the second information device.

* * * * *